US012763818B2

(12) United States Patent
Wai et al.

(10) Patent No.: US 12,763,818 B2
(45) Date of Patent: Oct. 13, 2026

(54) COMMUNICATION CONTROL METHOD AND COMMUNICATION CONTROL APPARATUS

(71) Applicant: NTT, Inc., Tokyo (JP)

(72) Inventors: Shuki Wai, Musashino (JP); Daisei Uchida, Musashino (JP); Tatsuhiko Iwakuni, Musashino (JP); Takuto Arai, Musashino (JP); Naoki Kita, Musashino (JP)

(73) Assignee: NTT, Inc., Tokyo (JP)

( * ) Notice: Subject to any disclaimer, the term of this patent is extended or adjusted under 35 U.S.C. 154(b) by 290 days.

(21) Appl. No.: 18/577,500

(22) PCT Filed: Jul. 14, 2021

(86) PCT No.: PCT/JP2021/026399
§ 371 (c)(1),
(2) Date: Jan. 8, 2024

(87) PCT Pub. No.: WO2023/286187
PCT Pub. Date: Jan. 19, 2023

(65) Prior Publication Data
US 2024/0333344 A1 Oct. 3, 2024

(51) Int. Cl.
*H04B 7/0408* (2017.01)
*H04B 7/08* (2006.01)

(52) U.S. Cl.
CPC ........... *H04B 7/0408* (2013.01); *H04B 7/088* (2013.01)

(58) Field of Classification Search
CPC ......... H04B 7/0408; H04B 7/08; H04B 7/008
See application file for complete search history.

(56) References Cited

U.S. PATENT DOCUMENTS 9,306,649 B2 * 4/2016 Kang .................. H04B 7/0623
10,893,542 B2 * 1/2021 Cho .................... H04B 7/0408
(Continued)

FOREIGN PATENT DOCUMENTS

JP 2019-207210 A 12/2019
WO 2020/041196 A1 2/2020

OTHER PUBLICATIONS

Suyama Satoshi et al., "5G Multi-antenna Technology", NTT DOCOMO Technical Journal, vol. 23, No. 4, pp. 30-39, Jan. 2016.
(Continued)

*Primary Examiner* — Hai V Nguyen

(57) ABSTRACT

A communication control method includes: a transmission step of simultaneously transmitting beam specifying signals including identical beam identifiers from a plurality of antennas to a wireless station for each of the beam identifiers by transmission beams associated with the beam identifiers; a reception step of receiving, by each of the plurality of antennas, a report signal including a selected beam identifier indicating a beam identifier selected on the basis of reception qualities of the beam specifying signals for the respective beam identifiers in the wireless station; and a selection step of selecting an antenna to be used for communication with the wireless station on the basis of reception qualities of the report signal respectively received by the plurality of antennas, and selecting a transmission beam associated with the selected beam identifier as a transmission beam to be used for communication with the wireless station.

6 Claims, 13 Drawing Sheets

(56) References Cited

U.S. PATENT DOCUMENTS

| | | | | |
|---|---|---|---|---|
| 11,277,214 | B2 * | 3/2022 | Miyatake | H04B 17/27 |
| 11,424,808 | B2 * | 8/2022 | Cao | H04B 7/06956 |
| 11,424,811 | B2 * | 8/2022 | Yu | H04B 7/0617 |
| 11,595,857 | B2 * | 2/2023 | Zhang | H04B 7/0617 |
| 11,700,047 | B2 * | 7/2023 | Lee | H04B 7/0691 375/347 |
| 2013/0010744 | A1 * | 1/2013 | Kang | H04B 7/0645 370/329 |
| 2015/0063481 | A1 | 3/2015 | Von Wrycza et al. | |
| 2019/0053286 | A1 * | 2/2019 | Cho | H04B 7/0408 |
| 2020/0136711 | A1 * | 4/2020 | Cao | H04B 7/0626 |
| 2021/0227487 | A1 | 7/2021 | Hosoda et al. | |
| 2021/0367691 | A1 * | 11/2021 | Miyatake | H04B 17/27 |

OTHER PUBLICATIONS

Kazuaki Takeda et al., "Status of Investigations on Physical-layer Elemental Technologies and High-frequency-band Utilization", NTT DOCOMO Technical Journal, vol. 25, No. 3, pp. 23-32, Oct. 2017.

Koji Takinami et al., "Standardization trend and elemental technology of millimeter wave band wireless LAN system", The Institute of Electronics, Information and Communication Engineers, Communication Society Magazine, No. 38, Autumn, pp. 100-106, 2016.

Daisei Uchida et al., "A Study on Distributed Antenna Systems using High-Frequency-Band for High-Density Terminals in Shadowing Environment", The Institute of Electronics, Information and Communication Engineers General Conference Proceedings 1, B-5-87, p. 375, Mar. 2020.

Masashi Iwabuchi et al., "Proposal of Generating and Controlling Millimeter-wave Multi-paths Utilizing Massive and Various Relay Schemes", The Institute of Electronics, Information and Communication Engineers General Conference Proceedings 1, B-5-101, p. 389, Mar. 2020.

Y. Ghasempour et al., "IEEE 802.11ay:Next-Generation 60 GHz Communication for 100 GB/s Wi-Fi", in IEEE Communications Magazine, vol. 55, No. 12, pp. 186-192, Dec. 2017.

* cited by examiner

611

| | DISTRIBUTED ANTENNA #1 | DISTRIBUTED ANTENNA #2 | … | DISTRIBUTED ANTENNA #j | … | DISTRIBUTED ANTENNA #m |
|---|---|---|---|---|---|---|
| BEAM #1 | BEAM ID #1 | BEAM ID #n+1 | … | BEAM ID #(j−1)×n+1 | … | BEAM ID #(m−1)×n+1 |
| BEAM #2 | BEAM ID #2 | BEAM ID #n+2 | … | BEAM ID #(j−1)×n+2 | … | BEAM ID #(m−1)×n+2 |
| ⋮ | ⋮ | ⋮ | … | ⋮ | … | ⋮ |
| BEAM #i | BEAM ID #i | BEAM ID #n+i | … | BEAM ID #(j−1)×n+i | … | BEAM ID #(m−1)×n+i |
| ⋮ | ⋮ | ⋮ | … | ⋮ | … | ⋮ |
| BEAM #n | BEAM ID #n | BEAM ID #2×n | … | BEAM ID #j×n | … | BEAM ID #m×n |

111

| | DISTRIBUTED ANTENNA #1 | DISTRIBUTED ANTENNA #2 | ... | DISTRIBUTED ANTENNA #j | ... | DISTRIBUTED ANTENNA #m |
|---|---|---|---|---|---|---|
| BEAM #1 | BEAM ID #1 | BEAM ID #1 | ... | BEAM ID #1 | ... | BEAM ID #1 |
| BEAM #2 | BEAM ID #2 | BEAM ID #2 | ... | BEAM ID #2 | ... | BEAM ID #2 |
| ⋮ | ⋮ | ⋮ | ... | ⋮ | ... | ⋮ |
| BEAM #i | BEAM ID #i | BEAM ID #i | ... | BEAM ID #i | ... | BEAM ID #i |
| ⋮ | ⋮ | ⋮ | ... | ⋮ | ... | ⋮ |
| BEAM #n | BEAM ID #n | BEAM ID #n | ... | BEAM ID #n | ... | BEAM ID #n |

-PRIOR ART-

-PRIOR ART-

-PRIOR ART-

COMMUNICATION CONTROL METHOD AND COMMUNICATION CONTROL APPARATUS

CROSS-REFERENCE TO RELATED APPLICATIONS

This application is a 371 U.S. National Phase of International Application No. PCT/JP2021/026399, filed on Jul. 14, 2021. The entire disclosure of the above application is incorporated herein by reference.

TECHNICAL FIELD

The present invention relates to a communication control method and a communication control apparatus.

BACKGROUND ART

There is a beamforming technology for forming a beam that concentrates power in a specific direction. In particular, in a high-frequency band such as a millimeter wave band and a terahertz band, since a free space propagation loss is larger than that in a low-frequency band such as a microwave band, it is necessary to use beamforming to compensate for the free space propagation loss (see, for example, Non Patent Literature 1).

In a case where the beamforming is point-to-point (P-P) type communication in which a combination of wireless stations that communicate with each other is always determined, and in a case where a positional relationship between both wireless stations and a propagation environment around both wireless stations do not change, a beam can be fixedly used that is formed in advance in a specific direction at the time of installation of the wireless station or the like. However, in a case of Point-to-Multi Point (P-MP) type communication in which multiple wireless stations are accommodated, or in a case where at least one of wireless stations that communicate with each other moves, an appropriate forming direction of a beam changes, and thus a beam formed in a specific direction cannot be fixedly used.

In such a case, it is necessary to perform control to adaptively change the forming direction of the beam in accordance with the positional relationship between both wireless stations and the change in the propagation environment around both wireless stations. Beamforming in which the forming direction of the beam is adaptively controlled in this manner is referred to as adaptive beamforming. Generally, in the adaptive beamforming, a mechanical drive unit is not required to change the forming direction of the beam. In the adaptive beamforming, a beam having directivity is formed by adjusting a phase relationship between radio waves respectively radiated from a plurality of antenna elements.

However, to appropriately adjust this phase relationship, it is necessary to grasp the phase relationship for each of combinations of a plurality of antenna elements of a wireless station on a transmission side and a plurality of antenna elements of a wireless station on a reception side, and derive an optimal phase relationship from a plurality of the phase relationships. That is, it is necessary to respectively grasp states of propagation paths for all combinations of the antenna elements on the transmission side and the antenna elements on the reception side.

It is possible to grasp the state of the propagation path for all the combinations described above, for example, by transmitting and receiving a known signal between the wireless station on the transmission side and the wireless station on the reception side. However, in the above method, overhead in communication increases from a point that other communication cannot be performed while the known signal is transmitted and received, and a point that it is necessary to accurately transmit the state of the propagation path.

For that reason, in general adaptive beamforming, a plurality of discretely set beams is set in advance. Beam identifiers (IDs) that can uniquely identify respective beams are associated with the plurality of beams. For example, in the adaptive beamforming, a beam specifying signal including a beam ID is transmitted and received between both wireless stations by a beam associated with the beam ID. Then, on the basis of a result of transmission and reception of the beam specifying signal by each beam, an optimal beam and a beam ID associated with the beam are specified between both wireless stations. The adaptive beamforming can suppress an increase in overhead by such beam selection.

The beam selection as described above is defined in Third Generation Partnership Project (3GPP) 5th Generation (5G) and Institute of Electrical and Electronics Engineers (IEEE) 802.11ad, and has been implemented in a wireless communication system that has been put into practical use in recent years (see, for example, Non Patent Literatures 1, 2, and 3).

Generally, the beam selection is performed in the following procedure. First, one wireless station transmits a beam specifying signal to the other wireless station. The beam specifying signal mentioned here is a signal for enabling the other wireless station to specify a beam used for transmission of the beam specifying signal in one wireless station. Here, one wireless station performs transmission control so that beam specifying signals transmitted by the respective beams do not interfere with each other. Specifically, one wireless station sequentially transmits the beam specifying signals in the respective beams by shifting transmission timings. Hereinafter, sequentially transmitting the beam specifying signals by shifting transmission timings in the respective beams by the wireless station may be referred to as a “sweep”.

Next, the other wireless station respectively measures reception qualities of the beam specifying signals sequentially transmitted from one wireless station by respective beams. The other wireless station selects, for example, a beam specifying signal having the best reception quality. The other wireless station transmits a signal including information based on the selected beam specifying signal (Hereinafter, referred to as a “feedback signal”.) to one wireless station. With the above configuration, in the adaptive beamforming, in a case where one wireless station performs data transmission to the other wireless station, it is possible to recognize which beam is optimal to use.

Note that, as the beam specifying signal, for example, it is possible to a beam search signal including a beam identifier (ID) for identifying a beam used by one wireless station, or the like. Here, the beam search signal is, for example, a signal defined in Sector Sweep Frame (SSW) defined in IEEE 802.11ay (see, for example, Non Patent Literature 6), Synchronization Signal/Physical Broadcast Channel (SS/PBCH) defined in 5G (see, for example, Non Patent Literature 2), or the like.

FIG. 13 illustrates a general system configuration of a conventional wireless communication system. As illustrated in FIG. 13, a digital signal processing device that transmits and receives signals and a base station antenna are connected to each other on a one-to-one basis. That is, in this case, one cell is formed for one base station antenna. In this configuration, one terminal device is connected to one base station antenna that is only one base station antenna existing in the cell.

Here, as described above, since the beamforming technology is used in a high-frequency band such as a millimeter wave band and a terahertz band, influence of a reflected wave and a diffracted wave is reduced. On the other hand, in this case, when a line of sight between wireless stations is shielded, there is a feature that there is a high possibility that communication is interrupted. As described above, in a case of the conventional cell configuration, when the line of sight from one base station antenna is shielded, there is a high possibility that communication is interrupted. Thus, in wireless communication using a high-frequency band, it has been studied to use a wireless communication system using a distributed antenna having an effect of improving shielding resistance (Hereinafter, referred to as a "distributed antenna system".) (see, for example, Non Patent Literatures 4 and 5 and Patent Literature 1).

FIG. 14 illustrates a general system configuration of a conventional distributed antenna system. As illustrated in FIG. 14, a digital signal processing device that transmits and receives signals and a distributed antenna are connected to each other on a one-to-many basis. That is, in the distributed antenna system, one cell is formed by a plurality of distributed antennas. In this configuration, one terminal device is connected to any of the plurality of distributed antennas existing in the cell.

In addition, as illustrated in FIG. 14, a communication control device is connected to the digital signal processing device. The communication control device performs control of a distributed antenna that establishes wireless communication connection with each terminal device, control of a beam used by the distributed antenna, and the like. In particular, in a cellular communication system or the like, the communication control device is used to perform centralized control. In this case, the communication control device further performs processing such as user scheduling and resource control.

With such a distributed antenna system, even if a line of sight from one distributed antenna existing in the cell is shielded, the terminal device can establish wireless communication connection with another distributed antenna existing in the cell. To implement such a distributed antenna system, it is necessary to select an optimal distributed antenna from the plurality of distributed antennas in the cell in addition to selecting an optimal beam. Hereinafter, selecting the optimal distributed antenna and the optimal beam is referred to as "antenna and beam selection".

Generally, the antenna and beam selection in the distributed antenna system is performed in the following procedure. First, one wireless station (for example, an accommodated station) transmits a beam specifying signal to the other wireless station (for example, a terminal device). Here, as illustrated in FIG. 15, one wireless station performs a sweep so that beam specifying signals transmitted by respective beams do not interfere with each other. FIG. 15 is a schematic diagram illustrating an outline of a sweep by the conventional distributed antenna system.

Next, the other wireless station respectively measures reception qualities of the beam specifying signals sequentially transmitted by the distributed antennas and beams. The other wireless station specifies, for example, a beam specifying signal having the best reception quality. The other wireless station transmits a feedback signal indicating a specifying result to one wireless station. With the above configuration, one wireless station can recognize which beam of which distributed antenna is optimal to use in the case of performing data transmission to the other wireless station.

CITATION LIST

Patent Literature

Patent Literature 1: JP 2019-207210 A

Non Patent Literature

Non Patent Literature 1: "5G Multi-antenna Technology", NTT DOCOMO Technical Journal, Vol. 23, No. 4, pp. 30-39, January 2016

Non Patent Literature 2: Kazuaki Takeda et al., "Status of Investigations on Physical-layer Elemental Technologies and High-frequency-band Utilization", NTT DOCOMO Technical Journal, Vol. 25, No. 3, pp. 23-32, October 2017

Non Patent Literature 3: Koji Takinami et al., "Miribatai musen LAN system no hyoujunka doukou to youso gijutsu (Standardization trend and elemental technology of millimeter wave band wireless LAN system)", The Institute of Electronics, Information and Communication Engineers, Communication Society Magazine, No. 38, autumn, pp. 100-106, 2016

Non Patent Literature 4: Daisei Uchida et al., "Tanmatsu koumitsudo/shahei kankyou deno kousbuuhasuutai bunsan antenna system no ichi kentou (Study on a high-frequency band dispersive antenna system in terminals with high density and shielding environment)", The Institute of Electronics, Information and Communication Engineers General Conference Proceedings 1, B-5-87, p. 375, March 2020

Non Patent Literature 5: Masashi Iwabuchi et al., "Tasuu tayou na chuukei kei niyoru koushuuhasuutai multipath keisei seigyo no teian (Proposal for multipath formation control in high-frequency bands using multiple and diverse relay systems)", The Institute of Electronics, Information and Communication Engineers General Conference Proceedings 1, B-5-101, p. 389, March 2020

Non Patent Literature 6: Y. Ghasempour, et al., "IEEE 802.11ay: Next-Generation 60 GHZ Communication for 100 Gb/s Wi-Fi," in IEEE Communications Magazine, Vol. 55, No. 12, pp. 186-192, December 2017.

SUMMARY OF INVENTION

Technical Problem

As illustrated in FIG. 15, in a distributed antenna system that uses a high-frequency band and in which a plurality of distributed antennas is arranged for one cell, it is necessary to perform the antenna and beam selection by performing a sweep sequentially for each distributed antenna so that beam specifying signals respectively transmitted from the plurality of distributed antennas do not interfere with each other. For that reason, particularly in a case where the number of distributed antennas increases, a time required for beam selection becomes longer. As a result, there is a problem that overhead increases and data transmission efficiency decreases.

In addition, in general, a distributed antenna system using a high-frequency band needs to periodically perform beam selection at an appropriate frequency to follow a propagation path fluctuation accompanying movement of a terminal device, a change in surrounding environment, and the like. However, if the time required for one beam selection becomes too long due to an increase in the number of distributed antennas, the time required for the beam selection may become longer than the beam selection execution period. In this case, since the beam selection cannot be completed within the beam selection execution period, it is difficult to perform data transmission itself.

In view of the above circumstances, an object of the present invention is to provide a communication control method and a communication control apparatus capable of performing beam selection without increasing the time required for beam selection with respect to an increase in the number of distributed antennas.

Solution to Problem

An aspect of the present invention is a communication control method including: a transmission step of simultaneously transmitting beam specifying signals including identical beam identifiers from a plurality of antennas to a wireless station for each of the beam identifiers by transmission beams associated with the beam identifiers; a reception step of receiving, by each of the plurality of antennas, a report signal including a selected beam identifier indicating a beam identifier selected on the basis of reception qualities of the beam specifying signals for the respective beam identifiers in the wireless station; and a selection step of selecting an antenna to be used for communication with the wireless station on the basis of reception qualities of the report signal respectively received by the plurality of antennas, and selecting a transmission beam associated with the selected beam identifier as a transmission beam to be used for communication with the wireless station.

An aspect of the present invention is a communication control method including: a transmission step of transmitting beam specifying signals from a plurality of antennas to a wireless station at a transmission timing determined in advance for each of a plurality of transmission beams by sequentially using the plurality of transmission beams; a reception step of receiving, by each of the plurality of antennas, a report signal including information based on a beam specifying signal selected on the basis of reception timings and reception qualities of the beam specifying signals for the respective transmission beams in the wireless station; and a selection step of selecting an antenna to be used for communication with the wireless station on the basis of reception qualities of the report signal respectively received by the plurality of antennas, and selecting a transmission beam to be used for communication with the wireless station on the basis of the information included in the report signal.

An aspect of the present invention is a communication control method for a wireless communication system including a first wireless station and a second wireless station, the communication control method including: a first transmission step in which the first wireless station simultaneously transmits beam specifying signals including identical beam identifiers from a plurality of antennas to the second wireless station for each of the beam identifiers by transmission beams associated with the beam identifiers; a first reception step in which the second wireless station receives the beam specifying signals transmitted from the first wireless station for each of the beam identifiers; a first selection step in which the second wireless station selects a selected beam identifier that is a specific beam identifier from a plurality of the beam identifiers on the basis of reception qualities of the beam specifying signals for the respective beam identifiers: a second transmission step in which the second wireless station transmits a report signal including the selected beam identifier to the first wireless station; a second reception step in which the first wireless station receives the report signal by each of the plurality of antennas; and a second selection step in which the first wireless station selects an antenna to be used for communication with the second wireless station on the basis of reception qualities of the report signal respectively received by the plurality of antennas, and selects a transmission beam associated with the selected beam identifier as a transmission beam to be used for communication with the second wireless station.

An aspect of the present invention is a communication control device (apparatus) including: a transmission and reception unit that simultaneously transmits beam specifying signals including identical beam identifiers from a plurality of antennas to a wireless station for each of the beam identifiers by transmission beams associated with the beam identifiers, and receives, by each of the plurality of antennas, a report signal including a selected beam identifier indicating a beam identifier selected on the basis of reception qualities of the beam specifying signals for the respective beam identifiers in the wireless station; and a selection unit that selects an antenna to be used for communication with the wireless station on the basis of reception qualities of the report signal respectively received by the plurality of antennas, and selects a transmission beam associated with the selected beam identifier as a transmission beam to be used for communication with the wireless station.

An aspect of the present invention is a communication control device (apparatus) including: a transmission and reception unit that transmits beam specifying signals from a plurality of antennas to a wireless station at a transmission timing determined in advance for each of a plurality of transmission beams by sequentially using the plurality of transmission beams, and receives, by each of the plurality of antennas, a report signal including information based on a beam specifying signal selected on the basis of reception timings and reception qualities of the beam specifying signals for the respective transmission beams in the wireless station: and a selection unit that selects an antenna to be used for communication with the wireless station on the basis of reception qualities of the report signal respectively received by the plurality of antennas, and selects a transmission beam to be used for communication with the wireless station on the basis of the information included in the report signal.

Advantageous Effects of Invention

According to the present invention, it is possible to perform beam selection without increasing the time required for beam selection with respect to an increase in the number of distributed antennas.

DESCRIPTION OF EMBODIMENTS

Hereinafter, a description will be given of a configuration of a distributed antenna system in an embodiment of the present invention with reference to the drawings. Note that, to make the description easier to understand, a configuration of a conventional distributed antenna system will be described first as a comparison target.

Figure 14:
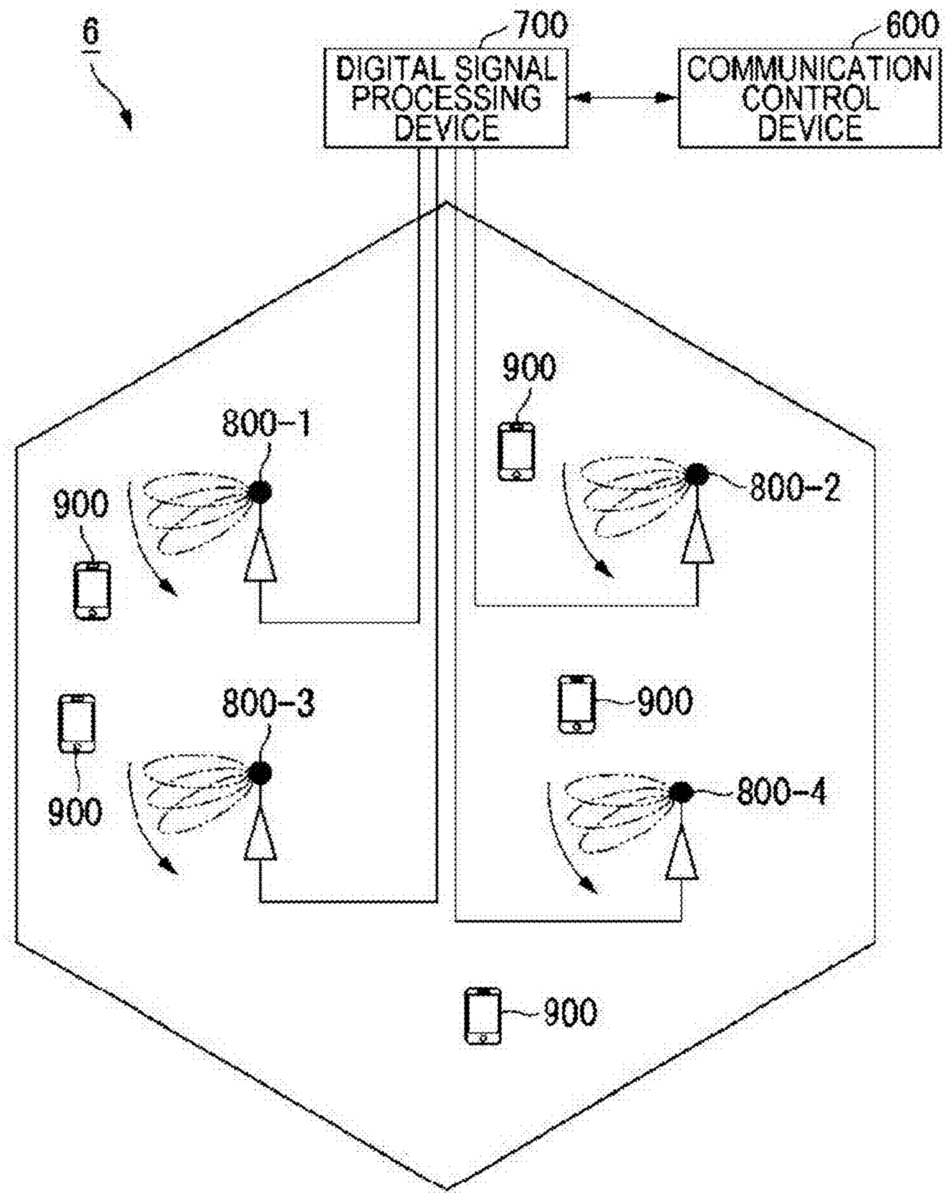
FIG. 14 is a diagram illustrating a general system configuration of a conventional distributed antenna system.
Figure 15:
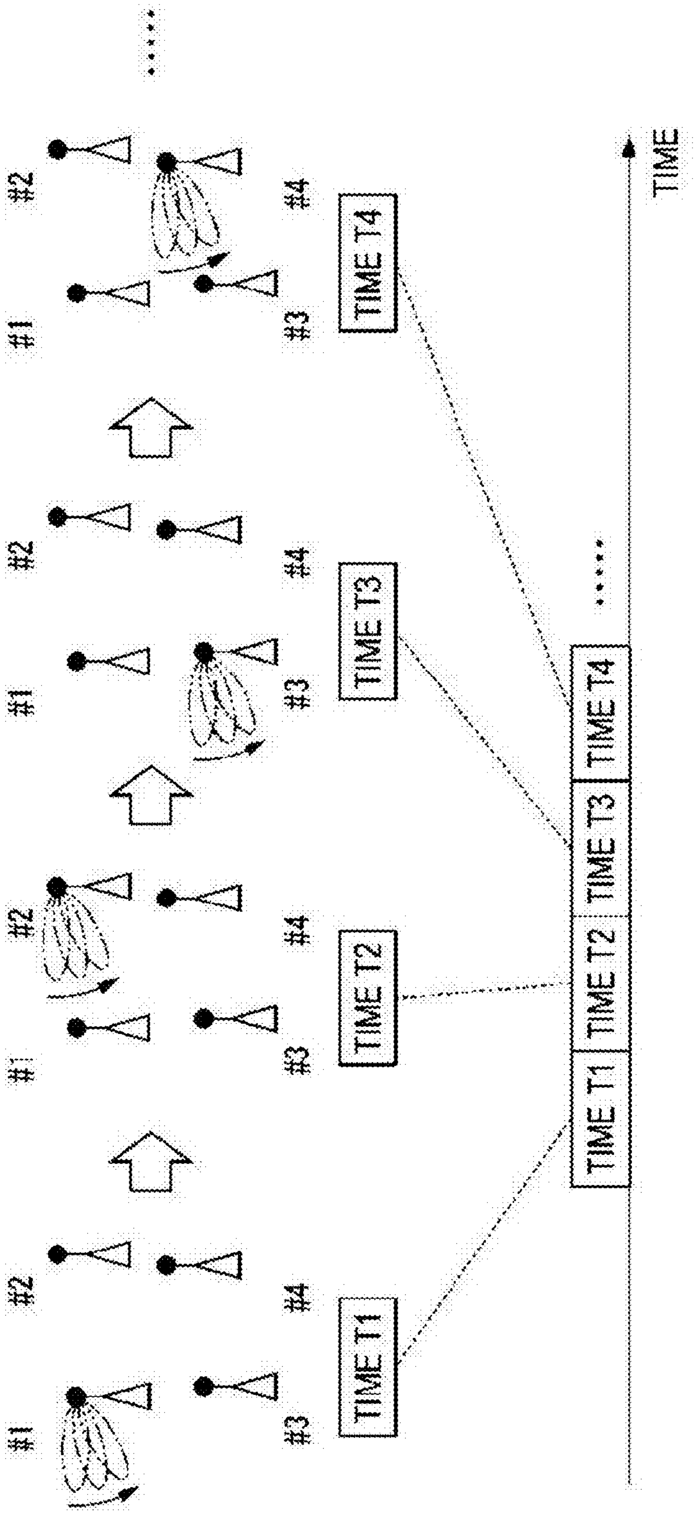
FIG. 15 is a schematic diagram illustrating an outline of a sweep by the conventional distributed antenna system.

Hereinafter, an overall configuration of a conventional distributed antenna system 6 will be described. As illustrated in FIG. 14, the distributed antenna system 6 includes a communication control device 600, a digital signal processing device 700, distributed antennas 800-1 to 800-4, and a plurality of terminal devices 900.

As illustrated in FIG. 14, the digital signal processing device 700 is connected to the communication control device 600 and the distributed antennas 800-1 to 800-4. The communication control device 600 and the distributed antennas 800-1 to 800-4, and the digital signal processing device 700 are configured to be able to communicate with each other. Hereinafter, the distributed antennas 800-1 to 800-4 will be simply referred to as "distributed antennas 800" in a case where it is not necessary to particularly distinguish the distributed antennas from each other for description.

The distributed antenna 800 is an antenna capable of performing adaptive beamforming. The distributed antenna 800 can perform wireless communication with the terminal device 900 by selectively using any of a plurality of types of beams.

The communication control device 600 is a control device for performing communication control related to beam selection, in which beams to be used in wireless communication between the distributed antennas 800-1 to 800-4 and the terminal device 900 are selected from a plurality of beams.

The digital signal processing device 700 is a communication device that transmits and receives signals to and from the terminal device 900 by using the distributed antennas 800-1 to 800-4.

Figures 1, 2:
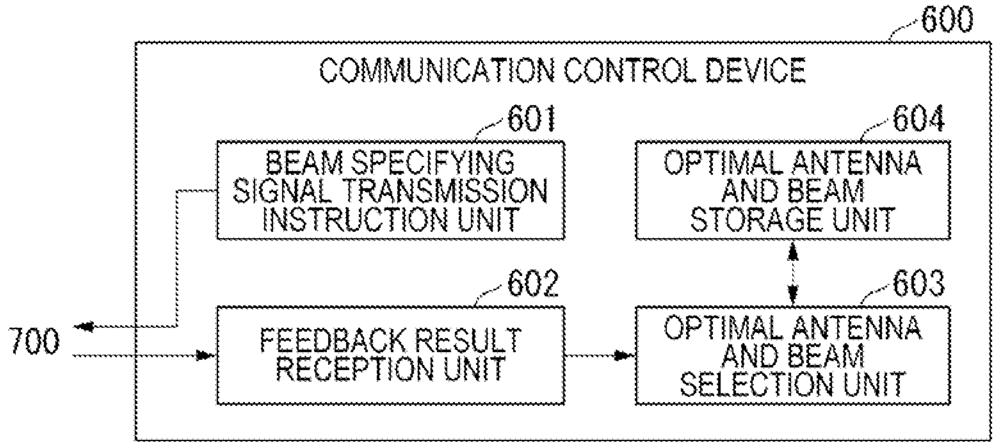
FIG. 1 is a block diagram illustrating a functional configuration of a communication control device 600 of a conventional distributed antenna system 6.
FIG. 2 is a diagram illustrating beam allocation information 611 generated by a beam specifying signal transmission instruction unit 601 of the conventional distributed antenna system 6.

Hereinafter, a configuration of the communication control device 600 will be described. FIG. 1 is a block diagram illustrating a functional configuration of the communication control device 600 of the conventional distributed antenna system 6. As illustrated in FIG. 1, the communication control device 600 includes a beam specifying signal transmission instruction unit 601, a feedback result reception unit 602, an optimal antenna and beam selection unit 603, and an optimal antenna and beam storage unit 604.

The beam specifying signal transmission instruction unit 601 allocates an identifier (Hereinafter, referred to as a "beam ID".) to each beam so that all beams used in the distributed antennas 800-1 to 800-4 can be uniquely specified. FIG. 2 illustrates an example of beam allocation information indicating the beam ID allocated by the beam specifying signal transmission instruction unit 601.

FIG. 2 is a diagram illustrating beam allocation information 611 generated by the beam specifying signal transmission instruction unit 601 of the conventional distributed antenna system 6. The beam allocation information 611 is stored in, for example, the optimal antenna and beam storage unit 604 or the like.

The beam allocation information 611 illustrated in FIG. 2 is an example of beam allocation information generated in a case where the number of distributed antennas is m and the number of beams used by each of the distributed antennas is n.

As illustrated in FIG. 2, the beam specifying signal transmission instruction unit 601 allocates beam IDs #1 to #n to respective n types of beams formed by the first distributed antenna (distributed antenna #1). Subsequently, the beam specifying signal transmission instruction unit 601 allocates beam IDs from #n+1 to #2×n to the respective n types of beams formed by the second distributed antenna (distributed antenna #2). The beam specifying signal transmission instruction unit 601 repeats allocation of beam IDs in this manner, and allocates beam IDs from #(m−1)×n+1 to #m×n to the respective n types of beams formed by the last m-th distributed antenna (distributed antenna #m).

That is, the beam specifying signal transmission instruction unit 601 allocates beam IDs from #(j−1)×n+1 to #j×n to the respective n types of beams formed by the j-th distributed antenna (distributed antenna #j). As a result, for all combinations of a plurality of distributed antennas 800 and a plurality of beams, the beam specifying signal transmission instruction unit 601 can respectively allocate beam IDs that can uniquely identify the combinations.

The beam specifying signal transmission instruction unit 601 outputs, to the digital signal processing device 700, a beam specifying signal transmission instruction that is an instruction for causing the transmitting beam specifying signals to be transmitted respectively from the distributed antennas 800-1 to 800-4 arranged in a distributed manner. The beam specifying signal transmission instruction includes information indicating beam IDs allocated to all combinations of the plurality of distributed antennas 800 and the plurality of beams.

In response to receiving the beam specifying signal transmission instruction, the digital signal processing device 700 causes the beam specifying signals to be transmitted respectively from the distributed antennas 800-1 to 800-4 arranged in a distributed manner, by using the beams. Each beam specifying signal to be transmitted is a beam search signal including information indicating a beam ID associated with a combination of the distributed antenna 800 and the beam used for transmission of the beam specifying signal.

The feedback result reception unit 602 acquires information indicating an optimal beam ID included in a feedback signal from the digital signal processing device 700. The feedback signal is transmitted from the terminal device 900, received by the distributed antenna 800, and then decoded by the digital signal processing device 700. The feedback result reception unit 602 outputs the acquired information indicating the optimal beam ID to the optimal antenna and beam selection unit 603.

The optimal beam ID is, for example, a beam ID included in a beam specifying signal having the best reception quality among beam specifying signals received by the terminal device 900. The reception quality here is, for example, a value such as reception power or Received Signal Strength Indicator (RSSI).

The optimal antenna and beam selection unit 603 acquires the optimal beam ID output from the feedback result reception unit 602. The optimal antenna and beam selection unit 603 refers to the beam allocation information 611 and specifies a combination of the distributed antenna 800 and the beam associated with the optimal beam ID. The optimal antenna and beam selection unit 603 causes the optimal antenna and beam storage unit 604 to store information indicating the specified combination of the distributed antenna 800 and the beam.

The optimal antenna and beam storage unit 604 stores the information indicating the specified combination of the distributed antenna 800 and the beam. The digital signal processing device 700 performs wireless communication with the terminal device 900 by using the distributed antenna 800 and the beam stored in the optimal antenna and beam storage unit 604. Note that the optimal antenna and beam storage unit 604 may store the beam allocation information 611 illustrated in FIG. 2.

With the above configuration, on the distributed antenna 800 side (accommodated station side), a setting is made to transmit a signal to the terminal device 900 by the distributed antenna 800 and the beam associated with the optimal beam ID.

Figure 3:
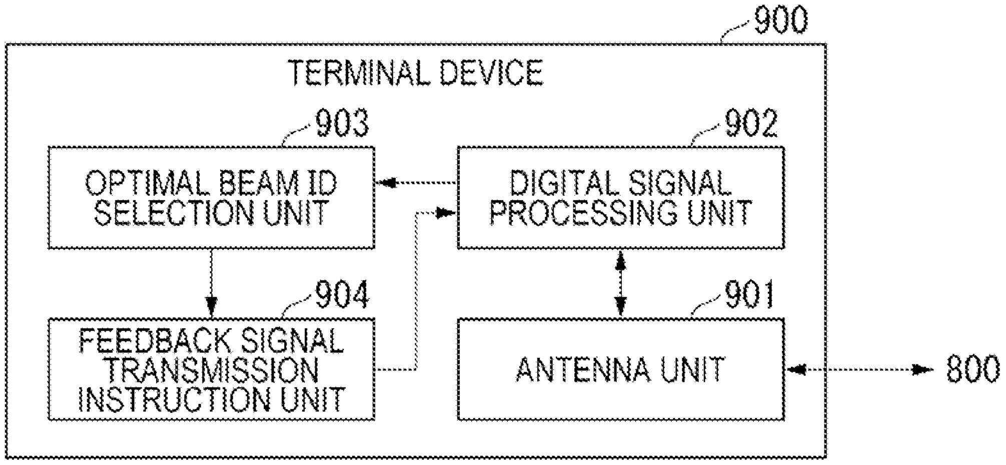
FIG. 3 is a block diagram illustrating a functional configuration of a terminal device 900 of the conventional distributed antenna system 6.

Hereinafter, a configuration of the terminal device 900 will be described. FIG. 3 is a block diagram illustrating a functional configuration of the terminal device 900 of the conventional distributed antenna system 6. The terminal device 900 is an information processing device such as a smartphone, a tablet terminal, or a notebook PC, for example. As illustrated in FIG. 3, the terminal device 900 includes an antenna unit 901, a digital signal processing unit 902, an optimal beam ID selection unit 903, and a feedback signal transmission instruction unit 904.

The antenna unit 901 receives a wireless signal transmitted from the distributed antenna 800. For example, the antenna unit 901 receives the beam specifying signal transmitted from the distributed antenna 800. The antenna unit 901 outputs the received wireless signal to the digital signal processing unit 902.

In addition, the antenna unit 901 acquires a feedback signal to be described later output from the digital signal processing unit 902. The antenna unit 901 transmits the acquired feedback signal to the distributed antenna 800 (accommodated station side).

The digital signal processing unit 902 acquires the wireless signal output from the antenna unit 901. In addition, the digital signal processing unit 902 measures the reception quality of the beam specifying signal for each beam ID included in the beam specifying signal received by the antenna unit 901. As described above, the reception quality is, for example, a value such as the reception power or the Received Signal Strength Indicator. The digital signal processing unit 902 outputs information indicating a measurement result of the reception quality of the beam specifying signal for each beam ID to the optimal beam ID selection unit 903.

In addition, the digital signal processing unit 902 acquires a feedback signal transmission instruction output from the feedback signal transmission instruction unit 904. The feedback signal transmission instruction includes the information indicating the optimal beam ID. When acquiring the feedback signal transmission instruction, the digital signal processing unit 902 generates a feedback signal including the information indicating the optimal beam ID. The digital signal processing unit 902 outputs the generated feedback signal to the antenna unit 901.

The optimal beam ID selection unit 903 acquires information indicating the measurement result of the reception quality of the beam specifying signal for each beam ID output from the digital signal processing unit 902. The optimal beam ID selection unit 903 specifies the optimal beam ID that is a beam ID included in the beam specifying signal having the best reception quality, for example. The optimal beam ID selection unit 903 outputs the information indicating the specified optimal beam ID to the feedback signal transmission instruction unit 904.

The feedback signal transmission instruction unit 904 acquires the information indicating the optimal beam ID output from the optimal beam ID selection unit 903. The feedback signal transmission instruction unit 904 outputs, to the digital signal processing unit 902, the feedback signal transmission instruction that is an instruction for causing the feedback signal including the information indicating the optimal beam ID to be transmitted to the distributed antenna 800.

Figure 4:
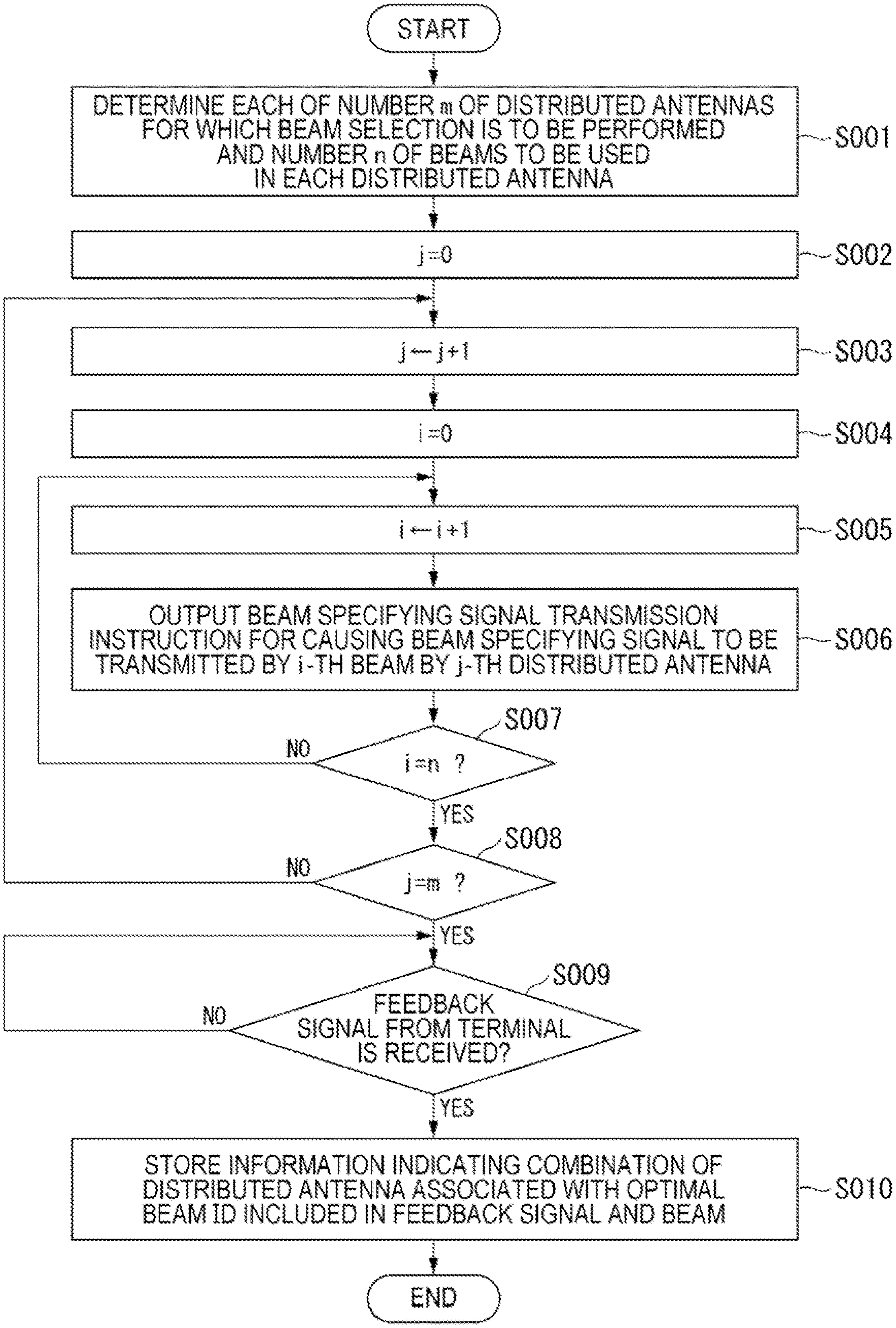
FIG. 4 is a flowchart illustrating operation of the communication control device 600 of the conventional distributed antenna system 6.

Hereinafter, a description will be given of an example of operation of the communication control device 600 in antenna and beam selection performed by the conventional distributed antenna system 6. FIG. 4 is a flowchart illustrating the operation of the communication control device 600 of the conventional distributed antenna system 6.

First, the beam specifying signal transmission instruction unit 601 determines each of a value of the number m of the distributed antennas 800 for which beam selection is to be performed and a value of the number n of beams to be used in each distributed antenna 800 (step S001). At this time, as illustrated in FIG. 2, the beam specifying signal transmission instruction unit 601 respectively allocates, to all combinations of the plurality of distributed antennas 800 and the plurality of beams, beam IDs that can uniquely identify the combinations.

Next, the beam specifying signal transmission instruction unit 601 initializes a value of a counter j for counting the distributed antennas 800 that are caused to transmit the beam specifying signals, and sets j=0 (step S002).

Next, to cause the next distributed antenna 800 to transmit the beam specifying signal, the beam specifying signal transmission instruction unit 601 increments the value of the counter j by 1, and sets j←j+1 (step S003).

Next, the beam specifying signal transmission instruction unit 601 initializes a value of a counter i for counting beams that are caused to transmit the beam specifying signals, and sets i=0 (step S004).

Next, to cause the distributed antenna 800 to transmit the beam specifying signal by the next beam (that is, to cause a sweep of the beam to be performed), the beam specifying signal transmission instruction unit 601 increments the value of the counter i by 1, and sets i←i+1 (step S005).

Next, the beam specifying signal transmission instruction unit 601 outputs, to the digital signal processing device 700, a beam specifying signal transmission instruction that is an instruction for causing a beam specifying signal including information indicating a beam ID associated with a combination of the j-th distributed antenna 800 and the i-th beam to be transmitted by the i-th beam by the j-th distributed antenna 800 (step S006).

The beam specifying signal transmission instruction unit 601 repeats output of the beam specifying signal transmission instruction to the digital signal processing device 700 until the beam specifying signals are caused to be sequentially transmitted from the j-th distributed antenna 800 by all the n types of beams (that is, until i=n is satisfied) (steps S005 to S007).

Further, the beam specifying signal transmission instruction unit 601 repeats output of the beam specifying signal transmission instruction to the digital signal processing device 700 until the beam specifying signals are caused to be transmitted from all the m distributed antennas 800 by the n types of beams (that is, until j=m is satisfied) (steps S003 to S008).

Next, the feedback result reception unit 602 waits for the feedback signal transmitted from the terminal device 900 for the transmitted beam specifying signals to be received by the distributed antennas 800 (step S009). Here, the feedback signal includes the information indicating the optimal beam ID as described above.

Note that the feedback signal transmitted from the terminal device 900 is simultaneously received by, for example, each distributed antenna 800 used in the transmission of the beam specifying signal, by a non-directional or low-directional beam.

Next, in a case where the feedback signal is received by the distributed antenna 800 (step S009: YES), the feedback result reception unit 602 acquires the optimal beam ID included in the received feedback signal. The feedback result reception unit 602 outputs the acquired optimal beam ID to the optimal antenna and beam selection unit 603.

The optimal antenna and beam selection unit 603 refers to the beam allocation information 611 and specifies a combination of the distributed antenna 800 and the beam associated with the optimal beam ID. The optimal antenna and beam selection unit 603 stores information indicating the specified combination of the distributed antenna 800 and the beam in the optimal antenna and beam storage unit 604 (step S010) Thus, the operation of the communication control device 600 illustrated in the flowchart of FIG. 4 ends.

Figure 5:
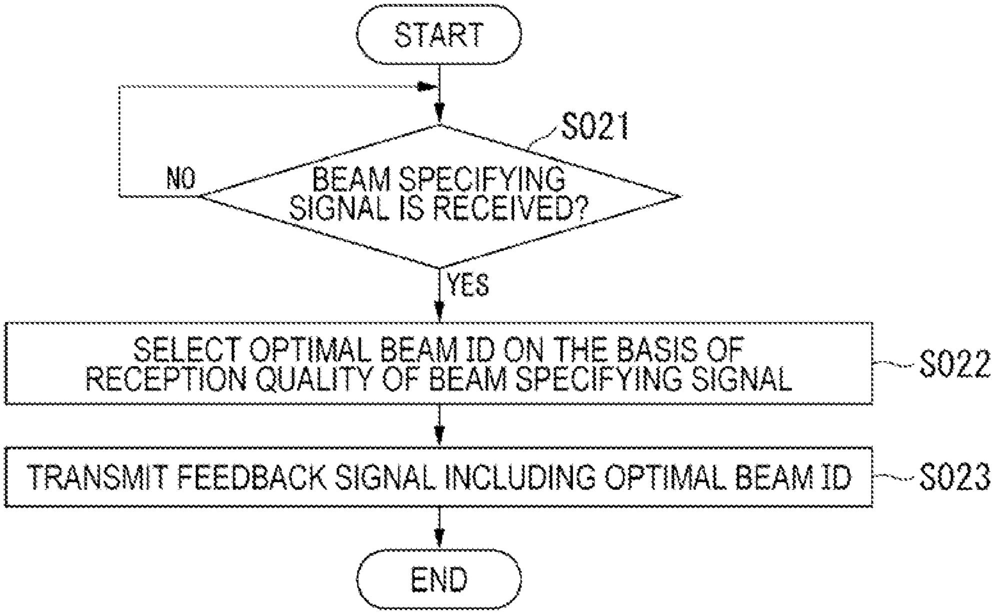
FIG. 5 is a flowchart illustrating operation of the terminal device 900 of the conventional distributed antenna system 6.

Hereinafter, a description will be given of an example of operation of the terminal device 900 in the antenna and beam selection performed by the distributed antenna system 6. FIG. 5 is a flowchart illustrating the operation of the terminal device 900 of the conventional distributed antenna system 6.

First, the digital signal processing unit 902 waits for the antenna unit 901 to receive the beam specifying signal for each beam ID transmitted from each distributed antenna 800 (step S021).

Note that the beam specifying signal for each beam ID transmitted from the distributed antenna 800 is sequentially received by, for example, the antenna unit 901 by a non-directional or low-directional beam.

In a case where the beam specifying signal for each beam ID transmitted from each distributed antenna 800 is received by the antenna unit 901 (step S021: YES), the digital signal processing unit 902 measures the reception quality of the beam specifying signal for each beam ID included in the beam specifying signal received by the antenna unit 901.

The optimal beam ID selection unit 903 selects the optimal beam ID on the basis of the reception quality of the beam specifying signal for each beam ID measured by the digital signal processing unit 902 (step S022). For example, the optimal beam ID selection unit 903 selects, as the optimal beam ID, the beam ID included in the beam specifying signal having the best reception quality.

Next, the feedback signal transmission instruction unit 904 outputs, to the digital signal processing unit 902, the feedback signal transmission instruction that is an instruction for causing the feedback signal including the information indicating the optimal beam ID to be transmitted to the distributed antenna 800. The digital signal processing unit 902 generates the feedback signal including the information indicating the optimal beam ID. The antenna unit 901 transmits the generated feedback signal to the distributed antenna 800 (step S023). Thus, the operation of the terminal device 900 illustrated in the flowchart of FIG. 5 ends.

First Embodiment

Hereinafter, a first embodiment of the present invention will be described.

In the conventional distributed antenna system 6 described above, when the number of distributed antennas 800 increases, the time required for beam selection also increases in proportion to the increase in the number of distributed antennas. For example, in a case where q types of beams are used in each distributed antenna 800, if the number of distributed antennas 800 increases by p, a time required for transmitting p×q beam specifying signals is further required.

Figure 6:
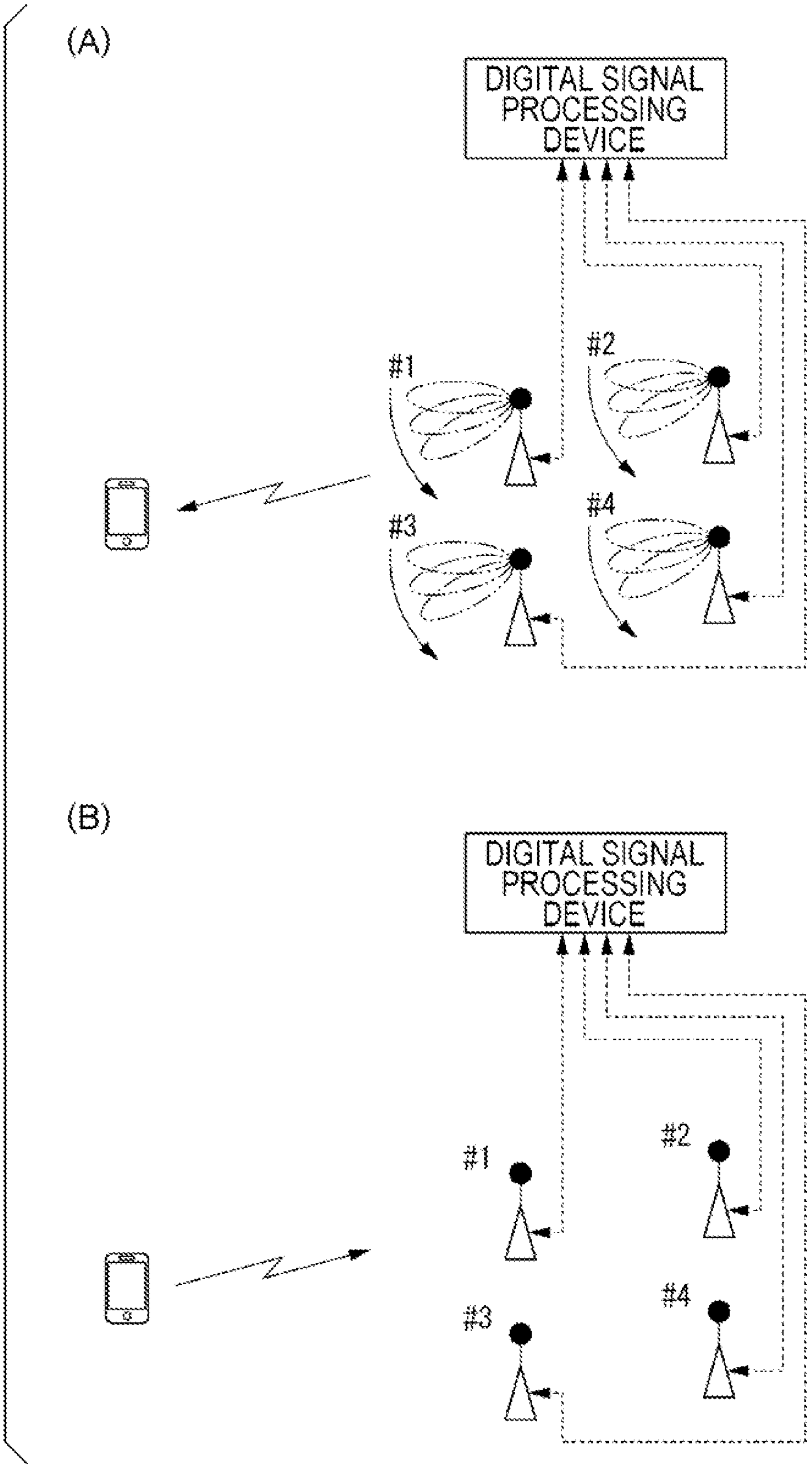
FIG. 6 is a schematic diagram illustrating an outline of beam selection by a distributed antenna system in a first embodiment of the present invention.

On the other hand, a distributed antenna system in the present embodiment described below can suppress an increase in time required for beam selection due to an increase in distributed antennas. FIG. 6 is a schematic diagram illustrating an outline of beam selection by the distributed antenna system in the first embodiment of the present invention.

As illustrated in FIG. 6(A), the distributed antenna system in the present embodiment simultaneously transmits identical beam specifying signals from a plurality of distributed antennas. As a result, the distributed antenna system in the present embodiment can increase the number of distributed antennas without increasing the time required for beam selection.

In the distributed antenna system of the present embodiment having the configuration as described above, similarly to the conventional distributed antenna system 6 described above, it is possible to include information that allows a reception side (wireless terminal side) to specify a beam used for transmission of a beam specifying signal (for example, a beam ID for identifying the beam) in the beam specifying signal. However, since the distributed antenna system of the present embodiment simultaneously transmits the identical beam specifying signals from the plurality of distributed antennas, the reception side (wireless terminal side) cannot specify from which distributed antenna the received beam specifying signal is transmitted.

Thus, as illustrated in FIG. 6(B), the distributed antenna system in the present embodiment receives a feedback signal transmitted from a terminal device by each distributed antenna, and measures a reception quality of the feedback signal for each distributed antenna. Then, the distributed antenna system in the present embodiment selects a distributed antenna optimal for wireless communication with the terminal device on the basis of a measurement result. With such a configuration, the distributed antenna system in the present embodiment can perform beam selection without increasing the time required for beam selection even in a case where the number of distributed antennas increases.

In addition, the distributed antenna system in the present embodiment simultaneously transmits the identical beam specifying signals from the plurality of distributed antennas, but when receiving the beam specifying signals transmitted from the plurality of distributed antennas, the terminal device side can regard the beam specifying signals transmitted simultaneously as multipath interference. For that reason, by applying a multipath interference compensation technology used in a general wireless communication system to the distributed antenna system in the present embodiment, quality degradation of wireless communication can be avoided. Note that, at this time, a setting may be made in consideration of arrival time difference of beam specifying signals from the plurality of distributed antennas using an allowable delay time difference of multipath interference.

In addition, a distributed antenna system 1 in the first embodiment uses a beam search signal as the beam specifying signal. The beam search signal is a beam specifying signal including information indicating a beam ID. Specifically, from each distributed antenna, by each beam, a beam search signal including a beam ID for identifying the beam is transmitted to the terminal device. The terminal device can specify the beam ID associated with the beam used for transmission of the beam search signal by receiving and decoding the beam search signal.

Configuration of Distributed Antenna System

Figure 7:
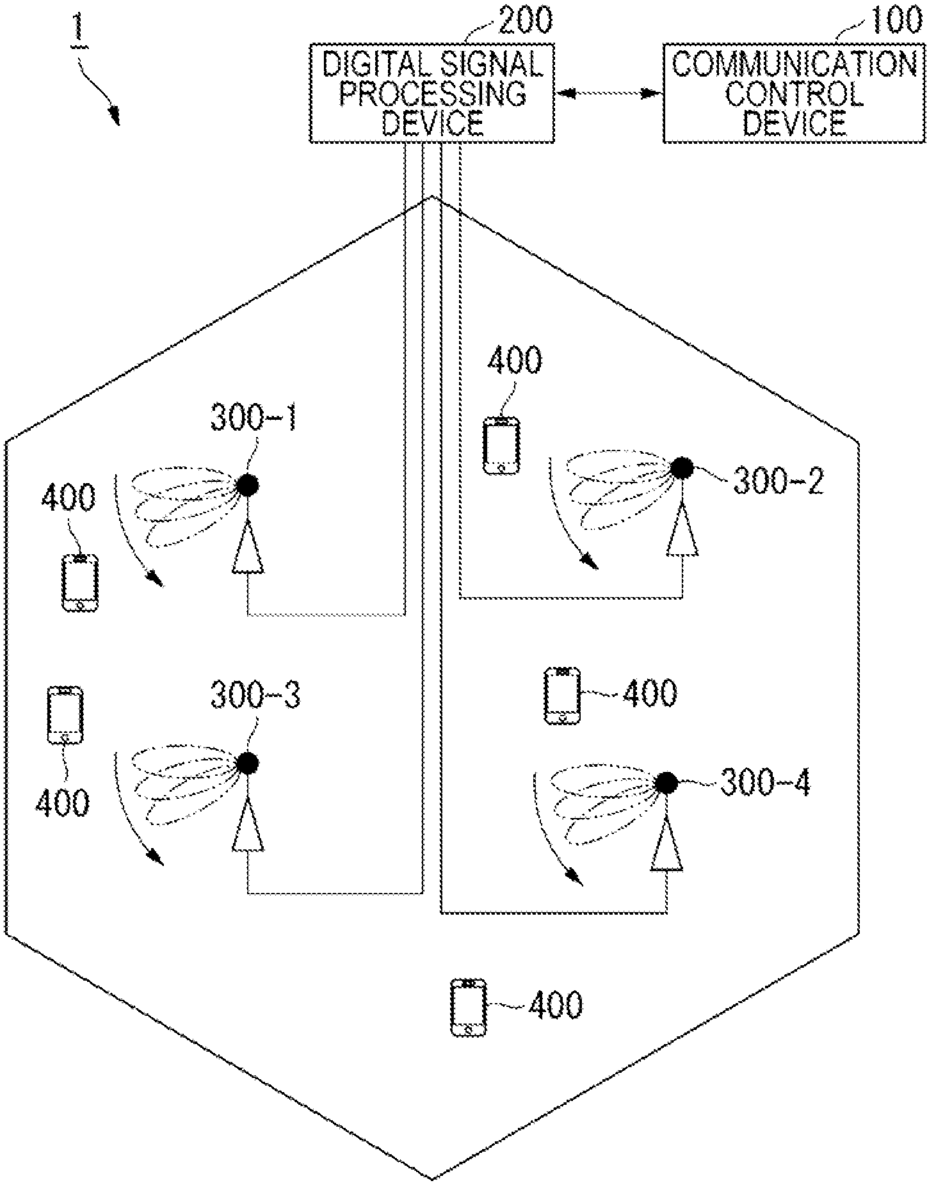
FIG. 7 is an overall configuration diagram of a distributed antenna system 1 in the first embodiment of the present invention.

Hereinafter, an overall configuration of the distributed antenna system 1 in the present embodiment will be described. FIG. 7 is an overall configuration diagram of the distributed antenna system 1 in the first embodiment of the present invention. The distributed antenna system 1 is a wireless communication system in which a plurality of (four in FIG. 7) distributed antennas is arranged for one cell and that performs communication using a high-frequency band.

As illustrated in FIG. 7, the distributed antenna system 1 includes a communication control device 100, a digital signal processing device 200, distributed antennas 300-1 to 300-4, and a plurality of terminal devices 400. The distributed antenna system 1 is a communication system including a plurality of distributed antennas on an accommodated station side. However, not limited to such a configuration, a distributed antenna system may be adopted in which both wireless stations facing each other each include a plurality of distributed antennas.

As illustrated in FIG. 7, the digital signal processing device 200 is connected to the communication control device 100 and the distributed antennas 300-1 to 300-4. The communication control device 100 and the distributed antennas 300-1 to 300-4, and the digital signal processing device 200 are configured to be able to communicate with each other. Hereinafter, the distributed antennas 300-1 to 300-4 will be simply referred to as "distributed antennas 300" in a case where it is not necessary to particularly distinguish the distributed antennas from each other for description.

The distributed antenna 300 is an antenna capable of performing adaptive beamforming. The distributed antenna 300 can select any of a plurality of types of beams to communicate with the terminal device 400. Note that, in FIG. 7, three types of beams formed by each distributed antenna 300 are illustrated by broken lines.

Note that, here, the number of the distributed antennas 300 is four, but may be two, three, or five or more. In addition, although five terminal devices 400 are illustrated in FIG. 7, the number of terminal devices 400 may be any number.

Each of the communication control device 100 and the digital signal processing device 200 includes an information processing device such as a general-purpose computer, for example. Note that the communication control device 100 and the digital signal processing device 200 may be an integrated device.

The communication control device 100 is a control device that performs communication control related to beam selection for selecting beams to be used in wireless communication between the distributed antennas 300-1 to 300-4 and the terminal device 400 from among the beams. That is, the communication control device 100 is a control device that controls processing related to beam selection in adaptive beamforming performed by the digital signal processing device 200, which is a communication device, using the distributed antennas 300-1 to 300-4.

The digital signal processing device 200 is a communication device that transmits and receives wireless signals to and from the terminal device 400 by using the distributed antennas 300-1 to 300-4.

Configuration of Communication Control Device

Figures 8, 9:
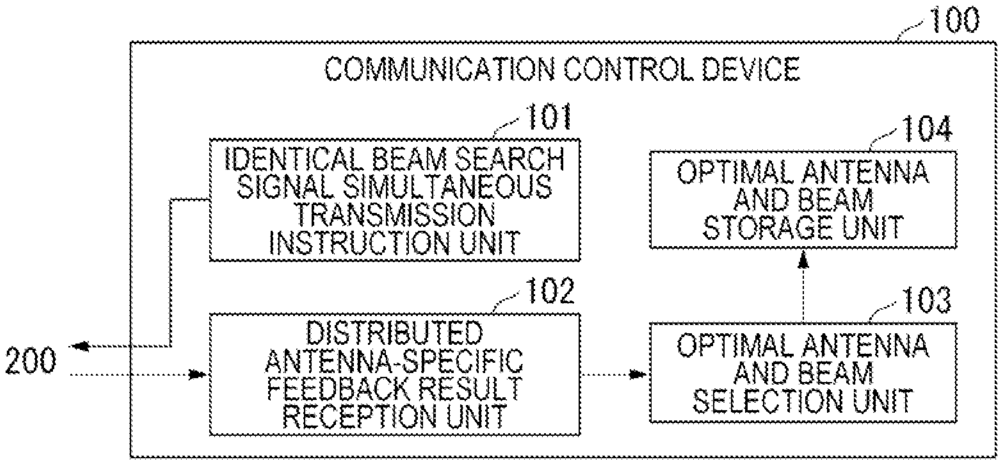
FIG. 8 is a block diagram illustrating a functional configuration of a communication control device 100 of the distributed antenna system 1 in the first embodiment of the present invention.
FIG. 9 is a diagram illustrating beam allocation information 111 generated by an identical beam search signal simultaneous transmission instruction unit 101 of the distributed antenna system 1 in the first embodiment of the present invention.

Hereinafter, a configuration of the communication control device 100 will be described. FIG. 8 is a block diagram illustrating a functional configuration of the communication control device 100 of the distributed antenna system 1 in the first embodiment of the present invention. As illustrated in FIG. 8, the communication control device 100 includes an identical beam search signal simultaneous transmission instruction unit 101, a distributed antenna-specific feedback result reception unit 102, an optimal antenna and beam selection unit 103, and an optimal antenna and beam storage unit 104.

The identical beam search signal simultaneous transmission instruction unit 101 allocates, to respective beams, beam IDs that are identifiers for uniquely specifying all beams used in the distributed antennas 300-1 to 300-4. FIG. 9 illustrates an example of beam allocation information indicating the beam IDs allocated by the identical beam search signal simultaneous transmission instruction unit 101.

FIG. 9 is a diagram illustrating beam allocation information 111 generated by the identical beam search signal simultaneous transmission instruction unit 101 of the distributed antenna system 1 in the first embodiment of the present invention. As illustrated in FIG. 9, the beam allocation information 111 is data in a table format in which a combination of the distributed antenna 300 and the beam, and a beam ID are associated with each other. The beam allocation information 111 is stored in, for example, the optimal antenna and beam storage unit 104 or the like.

The beam allocation information 111 illustrated in FIG. 9 is an example of beam allocation information generated in a case where the number of distributed antennas is m and the number of beans used by each distributed antenna is n. Note that, for example, in the distributed antenna system 1 in the present embodiment illustrated in FIG. 7 described above, since each of the four distributed antennas 300 uses three types of beams, m=4 and n=3 are set in this case.

As illustrated in FIG. 9, the identical beam search signal simultaneous transmission instruction unit 101 respectively allocates beam IDs #1 to #n to n types of beams formed by the first distributed antenna (distributed antenna #1). Similarly, the identical beam search signal simultaneous transmission instruction unit 101 respectively allocates the beam IDs #1 to in to the n types of beams formed by each of the second to m-th distributed antennas (distributed antennas #2 to #m).

That is, the identical beam search signal simultaneous transmission instruction unit 101 allocates identical beam IDs of #1 to #n to the respective n types of beams formed by each distributed antenna 300 regardless of by which distributed antenna 300 the beam is formed. As a result, the identical beam search signal simultaneous transmission instruction unit 101 can respectively allocate beam IDs that can uniquely identify the beams used for transmission of beam search signals. However, the distributed antennas 300 used for the transmission of the beam search signals cannot be specified by the beam IDs allocated by the identical beam search signal simultaneous transmission instruction unit 101.

The identical beam search signal simultaneous transmission instruction unit 101 outputs, to the digital signal processing device 200, a beam search signal transmission instruction that is an instruction for causing beam search signals to be transmitted respectively from the distributed antennas 300-1 to 300-4 arranged in a distributed manner. The beam search signal transmission instruction includes information indicating a beam ID allocated to each beam.

In response to the beam search signal transmission instruction, the digital signal processing device 200 causes the beam search signals to be simultaneously transmitted for each of the beams to which the identical beam IDs are allocated from the distributed antennas 300-1 to 300-4 arranged in a distributed manner. Each beam search signal to be transmitted includes information indicating a beam ID associated with a beam used for the transmission of the beam search signal.

The distributed antenna-specific feedback result reception unit 102 acquires information indicating the optimal beam ID included in the feedback signal from the digital signal processing device 200. The feedback signal is transmitted from the terminal device 400, received by the distributed antenna 300, and then decoded by the digital signal processing device 200. The optimal beam ID is, for example, a beam ID included in the beam search signal having the best reception quality among the beam search signals received by the terminal device 400.

In addition, the distributed antenna-specific feedback result reception unit 102 acquires information indicating a measurement result of the reception quality of the feedback signal in each distributed antenna 300 from the digital signal processing device 200. On the basis of the acquired measurement result, the distributed antenna-specific feedback result reception unit 102 determines, for example, the distributed antenna 300 having the best reception quality as a distributed antenna optimal for wireless communication with the terminal device 400.

The distributed antenna-specific feedback result reception unit 102 outputs, to the optimal antenna and beam selection unit 103, the acquired information indicating the optimal beam ID and information for identifying the distributed antenna determined as the optimal distributed antenna (Hereinafter, referred to as "optimal antenna ID".).

The optimal antenna and beam selection unit 103 acquires the optimal beam ID and the optimal antenna ID output from the distributed antenna-specific feedback result reception unit 102. The optimal antenna and beam selection unit 103 specifies the beam associated with the acquired optimal beam ID and the distributed antenna 300 associated with the optimal antenna ID. The optimal antenna and beam selection unit 103 causes the optimal antenna and beam storage unit 104 to store information indicating the combination of the distributed antenna 300 and the beam specified.

The optimal antenna and beam storage unit 104 stores the information indicating the combination of the distributed antenna 300 and the beam. The digital signal processing device 200 performs wireless communication with the terminal device 400 by using the combination of the distributed antenna 300 and the beam stored in the optimal antenna and beam storage unit 104. Note that the optimal antenna and beam storage unit 104 may store the beam allocation information 111 illustrated in FIG. 9.

The optimal antenna and beam storage unit 104 includes, for example, a storage medium such as a hard disk drive (HDD), a flash memory, an electrically erasable programmable read only memory (EEPROM), a random access read/write memory (RAM), and a read only memory (ROM), or any combination of these storage media.

With the above configuration, on the distributed antenna 300 side (accommodated station side), a setting is made to transmit a wireless signal to the terminal device 400 by using the distributed antenna 300 having a good reception quality of the feedback signal and the beam associated with the optimal beam ID.

Configuration of Terminal Device

Since a configuration of the terminal device 400 of the distributed antenna system 1 in the present embodiment is basically similar to the configuration of the terminal device 900 of the conventional distributed antenna system 6 illustrated in FIG. 3 described above, the description thereof will be omitted.

Operation of Communication Control Device

Figure 10:
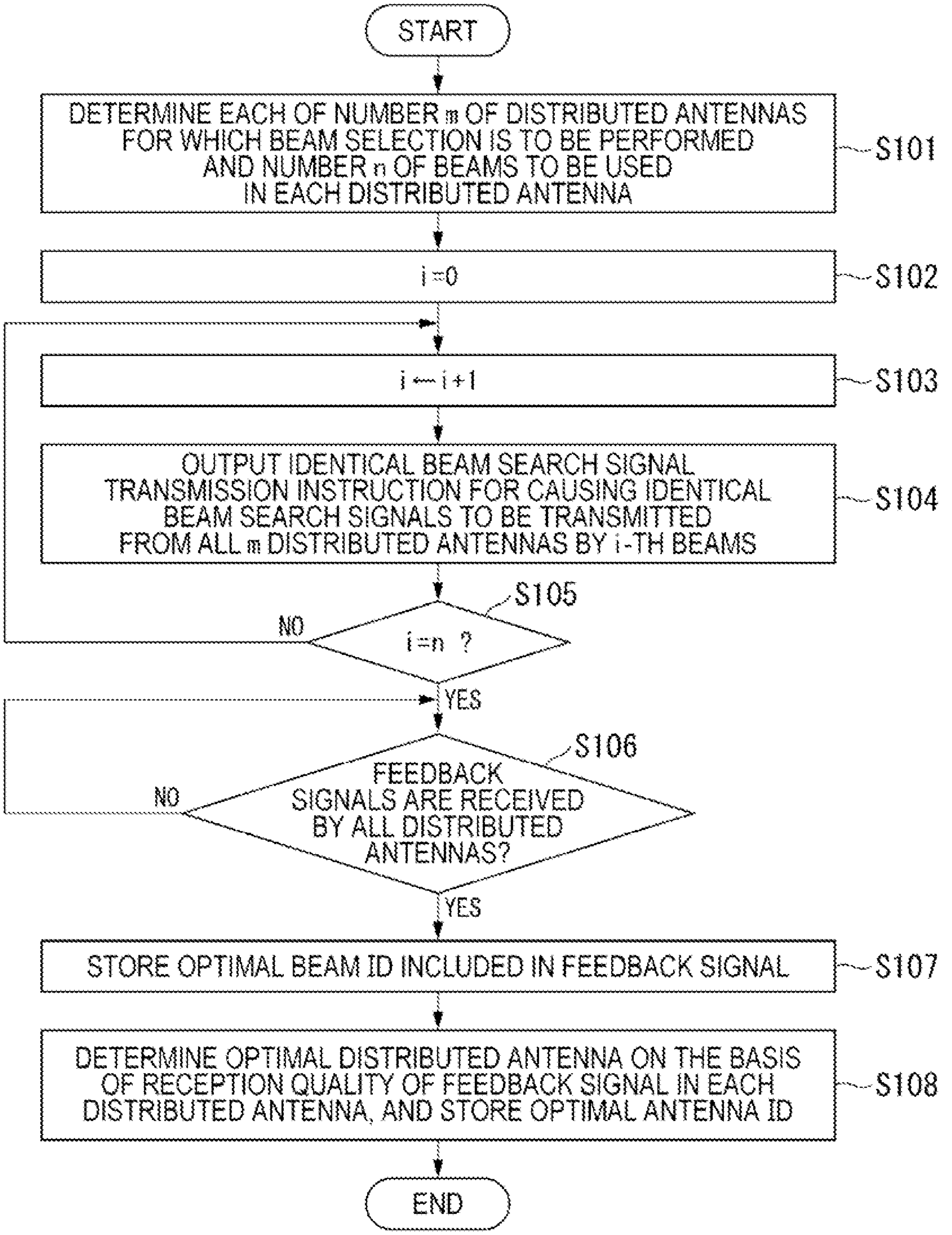
FIG. 10 is a flowchart illustrating operation of the communication control device 100 of the distributed antenna system 1 in the first embodiment of the present invention.

Hereinafter, a description will be given of an example of operation of the communication control device 100 in antenna and beam selection performed by the distributed antenna system 1. FIG. 10 is a flowchart illustrating operation of the communication control device 100 of the distributed antenna system 1 in the first embodiment of the present invention.

First, the identical beam search signal simultaneous transmission instruction unit 101 determines each of a value of the number m of the distributed antennas 300 for which beam selection is to be performed and a value of the number n of beams to be used in each distributed antenna 300 (step S101). At this time, as illustrated in FIG. 9, for each of beams simultaneously used for the transmission of the beam search signals by the plurality of distributed antennas 300, the identical beam search signal simultaneous transmission instruction unit 101 respectively allocates beam IDs that can uniquely identify the beams.

Next, the identical beam search signal simultaneous transmission instruction unit 101 initializes a value of a counter i for counting beams that are caused to transmit the beam search signals, and sets i=0 (step S102).

Next, to cause the beam search signal to be transmitted by the next beam (that is, to perform a sweep of the beam), the identical beam search signal simultaneous transmission instruction unit 101 increments the value of the counter i by 1, and sets i←i+1 (step S103).

Next, the identical beam search signal simultaneous transmission instruction unit 101 outputs, to the digital signal processing device 200, an identical beam search signal simultaneous transmission instruction that is an instruction for causing identical beam search signals including the information indicating the beam ID associated with the i-th beam to be transmitted from all the m distributed antennas 300 by the i-th beams (step S104).

The identical beam search signal simultaneous transmission instruction unit 101 repeats output of the identical beam search signal simultaneous transmission instruction to the digital signal processing device 200 until the beam search signals are caused to be transmitted from all the m distributed antennas 300 by the n types of beams (that is, until i=n is satisfied) (steps S103 to S105).

Next, the distributed antenna-specific feedback result reception unit 102 waits for the feedback signal transmitted from the terminal device 400 for the transmitted beam search signals to be received by all the m distributed antennas 300 (step S106). Here, the feedback signal includes the information indicating the optimal beam ID.

Note that the feedback signal transmitted from the terminal device 400 may be simultaneously received by, for example, the distributed antennas 300 used in the transmission of the beam search signals, by a non-directional or low-directional beam.

Next, in a case where the feedback signal is received by all the m distributed antennas 300 (step S106: YES), the distributed antenna-specific feedback result reception unit 102 acquires the information indicating the optimal beam ID included in the feedback signal from the digital signal processing device 200. The distributed antenna-specific feedback result reception unit 102 outputs the acquired optimal beam ID to the optimal antenna and beam selection unit 103. The optimal antenna and beam selection unit 103 causes the optimal antenna and beam storage unit 104 to store information indicating a beam associated with the optimal beam ID (step S107).

Next, the distributed antenna-specific feedback result reception unit 102 acquires the information indicating the measurement result of the reception quality of the feedback signal in each distributed antenna 300 from the digital signal processing device 200. On the basis of the acquired measurement result, the distributed antenna-specific feedback result reception unit 102 determines, for example, the distributed antenna 300 having the best reception quality as a distributed antenna optimal for wireless communication with the terminal device 400.

The distributed antenna-specific feedback result reception unit 102 outputs information indicating the distributed antenna 300 determined as the optimal distributed antenna to the optimal antenna and beam selection unit 103. The optimal antenna and beam selection unit 103 causes the optimal antenna and beam storage unit 104 to store the acquired information indicating the distributed antenna 300 (step S108). Thus, the operation of the communication control device 100 illustrated in the flowchart of FIG. 10 ends.

As described above, in the distributed antenna system 1 in the first embodiment of the present invention, the wireless station on the distributed antenna 300 side (accommodated station side) generates, for each beam, a beam search signal in which a beam ID that can uniquely identify each beam used in the distributed antenna 300 is embedded as digital information. The wireless station on the distributed antenna 300 side (accommodated station side) transmits the generated beam search signals simultaneously from the respective distributed antennas 300 on the beams that are associated with beam IDs and formed by the respective distributed antennas 300 while temporally switching the generated beam search signals for the respective beam IDs.

However, in the distributed antenna system 1 in the first embodiment of the present invention, since the identical beam search signals are transmitted from the plurality of distributed antennas 300, information for specifying the beam used for transmission can be included in the beam search signal, but information for specifying the distributed antenna 300 used for transmission cannot be included. Thus, in the distributed antenna system 1 in the present embodiment, the feedback signal transmitted from the terminal device 400 is simultaneously received by each distributed antenna 300, the reception quality of the feedback signal is measured for each distributed antenna 300, and it is determined which distributed antenna 300 is optimal for wireless communication with the terminal device 400.

The terminal device 400 receives the beam search signals simultaneously transmitted from the respective distributed antennas 300 for each of the beam IDs, and measures reception qualities (for example, reception powers) thereof. In addition, the terminal device 400 reads the beam IDs included in the received beam search signals. The terminal device 400 specifies the beam ID included in the beam search signal having the best reception quality on the basis of the measurement result of the reception qualities of the beam search signals for the respective beam IDs. The terminal device 400 embeds the specified beam ID in the feedback signal as the optimal beam ID. The terminal device 400 transmits the feedback signal including the optimal beam ID to the distributed antenna 300 side (accommodated station side).

The distributed antenna 300 side (accommodated station side) receives the feedback signal transmitted from the terminal device 400, and reads the optimal beam ID included in the received feedback signal. The distributed antenna 300 side (accommodated station side) performs setting to use the beam associated with the read optimal beam ID in wireless communication with the terminal device 400. In addition, the distributed antenna 300 side (the accommodated station side) receives the feedback signal transmitted from the terminal device 400 by all the distributed antennas 300. The distributed antenna 300 side (the accommodated station side) specifies the distributed antenna 300 that has received the feedback signal having the best reception quality (for example, reception power) among the feedback signals received by the respective distributed antennas 300. The distributed antenna 300 side (accommodated station side) performs setting to use the specified distributed antenna 300 in wireless communication with the terminal device 400.

As described above, conventionally, in a wireless communication system that uses a high-frequency band and in which a plurality of distributed antennas is arranged for one cell, it has been necessary for the plurality of distributed antennas to perform sweeps of beams in mutually different time so that beam search signals transmitted from the plurality of distributed antennas do not interfere with each other. For that reason, particularly in a case where the number of distributed antennas increases, there has been a problem that the time required for beam selection becomes longer, overhead increases, and data transmission efficiency may decrease. In addition, due to that the time required for beam selection becomes longer, there has been a problem that it becomes difficult to cause the directivity of the distributed antenna to follow movement of the terminal device, and wireless communication itself between the distributed antenna side (accommodated station side) and the terminal device may become difficult.

On the other hand, the distributed antenna system 1 in the first embodiment of the present invention has the configuration as described above, thereby simultaneously transmitting the beam search signals from the plurality of distributed antennas 300 to the terminal device 400, so that the transmission of the beam search signals from the plurality of distributed antennas 300 can be completed only in the time required for the transmission of the beam search signals by one distributed antenna 300. As a result, in the distributed antenna system 1 in the present embodiment, even in a case where the number of distributed antennas 300 increases, the time required for beam selection does not increase, and thus, the overhead does not increase and the data transmission efficiency does not decrease. In addition, in the distributed antenna system 1 in the present embodiment, even in a case where the number of distributed antennas 300 increases, the time required for beam selection does not increase, and thus, it is not difficult to cause the directivity of the distributed antenna 300 to follow movement of the terminal device 400, and it is possible to prevent the wireless communication itself between the distributed antenna side (accommodated station side) and the terminal device from becoming difficult.

Note that, in the distributed antenna system 1 in the present embodiment, since the identical beam search signals are simultaneously transmitted from the plurality of distributed antennas 300, the terminal device 400 can regard that multipath interference occurs when receiving the identical beam search signals transmitted from the plurality of distributed antennas 300. As a result, wireless quality degradation due to multipath interference can be avoided by using a multipath interference compensation technology used in a general wireless communication system.

Note that, in a wireless communication system, to compensate for multipath interference, it is common to apply equivalent processing in a terminal device and a multipath interference compensation technology by a communication method. For example, as a method of compensating for multipath interference, there are a method of using Orthogonal Frequency Division Multiplexing (OFDM)+Guard Interval (GI) to set a GI length greater than or equal to a multipath delay difference, a method of performing Single Carrier (SC)+Time Domain Equalization (TDE) with a sufficient number of taps, and the like.

Note that, in the distributed antenna system 1 in the present embodiment, the numbers of beams used by the plurality of distributed antennas 300 are the same, but different numbers of beams may be used for the respective distributed antennas 300. In this case, there may be a beam search signal transmitted only by the distributed antenna 300 having a larger number of beams to be used than the other distributed antennas 300.

Note that, in the distributed antenna system 1 in the present embodiment, the beam search signals are simultaneously transmitted from all the distributed antennas 300, but the beam search signals may be simultaneously transmitted from only some of the distributed antennas 300.

Note that, in the distributed antenna system 1 in the present embodiment, a case where beam selection is not performed on the terminal device 400 side has been described as an example, but the present invention is not limited thereto. For example, the terminal device 400 may be configured to perform adaptive beamforming using a plurality of beams similarly to the distributed antenna 300. In this case, for example, the terminal device 400 only needs to transmit a feedback signal including a beam ID to the distributed antenna 300 for each beam ID by a beam associated with the beam ID. Then, on the distributed antenna 300 side (the accommodated station side), the reception quality of the feedback signal is measured for each beam ID on the terminal device 400 side, and a beam ID included in a feedback signal having the best reception quality is used as an optimal beam ID (on the terminal device 400 side) to perform feedback to the terminal device 400. In addition, when receiving a beam search signal from the distributed antenna 300, the terminal device 400 may specify a beam to be used by switching reception beams and measuring the reception quality (for example, reception power) of each beam.

Second Embodiment

Hereinafter, a second embodiment of the present invention will be described.

In the distributed antenna system 1 in the first embodiment described above, the beam search signal including the information indicating the beam ID is used as the beam specifying signal. On the other hand, in the distributed antenna system 1 in the second embodiment described below, an unmodulated wave (CW) signal is used as the beam specifying signal.

In the present embodiment, since the unmodulated wave signal is used as the beam specifying signal, the beam specifying signal itself does not include the information indicating the beam ID. For that reason, in the present embodiment, it is necessary to notify the terminal device 400 of information indicating a transmission timing of the unmodulated wave signal for each beam ID (Hereinafter, referred to as "transmission timing information".) in advance from the distributed antenna 300 side (accommodated station side) so that the terminal device 400 can specify a beam ID associated with a beam used when the distributed antenna 300 transmits the unmodulated wave signal.

Specifically, all the distributed antennas 300 simultaneously perform sweeps of beams to transmit the unmodulated wave signals at the transmission timing of the unmodulated wave signal for each beam ID based on the transmission timing information of which the terminal device 400 is notified in advance from the distributed antenna 300 side (accommodated station side). The terminal device 400 receives the unmodulated wave signals at a reception timing synchronized with the transmission timing of the unmodulated wave signal for each beam ID, thereby being able to specify a beam ID of a beam used for transmission of each received unmodulated wave signal.

Note that, as a method of notification of the transmission timing information, for example, it is possible to use a method of performing notification by simultaneously transmitting signals including common transmission timing information by simultaneously performing sweeps of beams from a plurality of distributed antennas similarly to the beam specifying signals that are the unmodulated wave signals described above. Alternatively, as a method of notification of the transmission timing information, notification may be performed by using a non-directional antenna by a wireless communication system in a low-frequency band.

Note that, in a case where it is necessary to follow a propagation path fluctuation due to movement of the terminal device 400, a change in surrounding environment, or the like, it is desirable to periodically perform beam selection at an appropriate frequency. In this case, the notification of the transmission timing information may be performed every time the beam selection is periodically performed. Note that, in a case where the terminal device 400 is notified in advance that the beam selection is periodically performed, the overhead can be reduced by performing the notification of the transmission timing information only once at the beginning.

Note that, in the present embodiment, the terminal device 400 is notified of the transmission timing information indicating the transmission timing of the unmodulated wave signal for each beam ID in advance. Specifically, the terminal device 400 is notified of the transmission timing information including information indicating a transmission start timing of the unmodulated wave signal, a beam ID switching interval, and a beam ID switching sequence in advance from the distributed antenna 300 side (the accommodated station side). As a result, the terminal device 400 side can specify the transmission timing of the unmodulated wave signal for each beam ID.

Note that the terminal device 400 may be notified of transmission timing information including only information indicating the transmission start timing of the unmodulated wave signal and the beam ID switching interval in advance. In this case, the terminal device 400 only needs to specify which unmodulated wave signal has the best reception quality, and transmit a feedback signal indicating the order to the distributed antenna 300 side (accommodated station side). As a result, a communication control device 100*a* in the second embodiment can specify the optimal beam ID on the basis of the switching sequence order of the beam ID of the beam used at the time of transmission of the unmodulated wave signal and the order included in the feedback signal. Note that the unmodulated wave signal may be a signal having a certain bandwidth. For example, the unmodulated wave signal may be a spread signal.

Configuration of Distributed Antenna System

Since an overall configuration of the distributed antenna system 1 in the present embodiment is basically similar to the overall configuration of the distributed antenna system 1 in the first embodiment illustrated in FIG. 7 described above, the description thereof will be omitted.

Configuration of Communication Control Device

Figure 11:
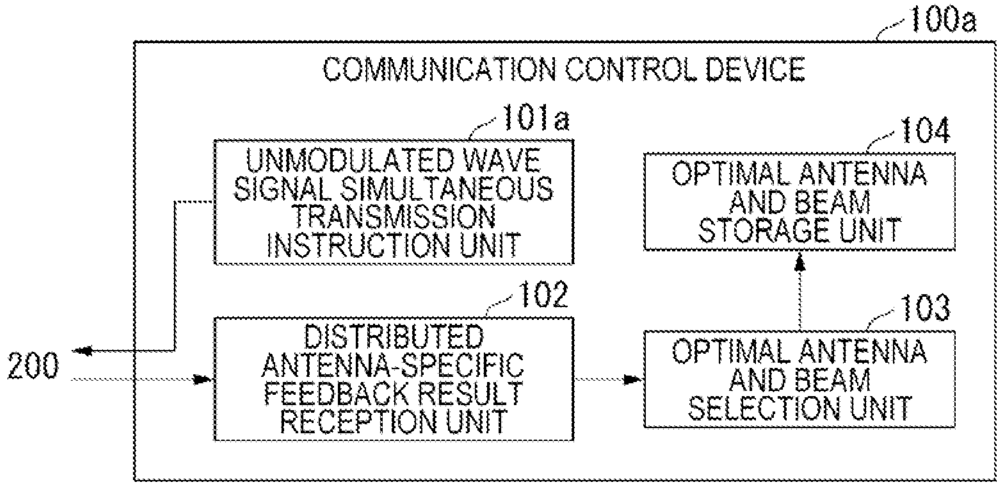
FIG. 11 is a block diagram illustrating a functional configuration of a communication control device 100*a* of a distributed antenna system in a second embodiment of the present invention.

Hereinafter, a configuration of the communication control device 100*a* of the present embodiment will be described. FIG. 11 is a block diagram illustrating a functional configuration of the communication control device 100*a* of the distributed antenna system in the second embodiment of the present invention.

As illustrated in FIG. 11, the communication control device 100*a* includes an unmodulated wave signal simultaneous transmission instruction unit 101*a*, the distributed antenna-specific feedback result reception unit 102, the optimal antenna and beam selection unit 103, and the optimal antenna and beam storage unit 104.

The unmodulated wave signal simultaneous transmission instruction unit 101*a* outputs, to the digital signal processing device 200, an instruction to simultaneously perform sweeps of beams and transmit the unmodulated wave signals from the plurality of distributed antennas 300 at the transmission timing of the unmodulated wave signal for each beam ID of which the terminal device 400 is notified in advance by the transmission timing information.

The distributed antenna-specific feedback result reception unit 102 acquires information indicating the optimal beam ID included in the feedback signal from the digital signal processing device 200. In addition, the distributed antenna-specific feedback result reception unit 102 acquires information indicating a measurement result of the reception quality of the feedback signal in each distributed antenna 300 from the digital signal processing device 200. On the basis of the acquired measurement result, the distributed antenna-specific feedback result reception unit 102 determines the distributed antenna 300 having the highest reception quality as a distributed antenna optimal for communication with the terminal device 400.

The distributed antenna-specific feedback result reception unit 102 outputs the acquired information indicating the optimal beam ID and the optimal antenna ID to the optimal antenna and beam selection unit 103.

The optimal antenna and beam selection unit 103 acquires the optimal beam ID and the optimal antenna ID output from the distributed antenna-specific feedback result reception unit 102. The optimal antenna and beam selection unit 103 specifies the beam associated with the acquired optimal beam ID and the distributed antenna 300 associated with the optimal antenna ID. The optimal antenna and beam selection unit 103 causes the optimal antenna and beam storage unit 104 to store information indicating the combination of the distributed antenna 300 and the beam specified.

The optimal antenna and beam storage unit 104 stores the information indicating the combination of the distributed antenna 300 and the beam. The digital signal processing device 200 performs wireless communication with the terminal device 400 by using the combination of the distributed antenna 300 and the beam stored in the optimal antenna and beam storage unit 104. Note that the optimal antenna and beam storage unit 104 may store the beam allocation information 111 illustrated in FIG. 9.

The optimal antenna and beam storage unit 104 includes, for example, a storage medium such as an HDD, a flash memory, an EEPROM, a RAM, or a ROM, or any combination of these storage media.

With the above configuration, on the distributed antenna 300 side, a setting is made to transmit a signal to the terminal device 400 by the distributed antenna and the beam associated with the optimal beam ID.

Configuration of Terminal Device

The terminal device 400 receives the unmodulated wave signal at each reception timing synchronized with the transmission timing of the unmodulated wave signal for each beam ID in the distributed antenna 300. The terminal device 400 can specify the beam ID associated with the unmodulated wave signal on the basis of the reception timing of the unmodulated wave signal, and the transmission timing information of which notification is performed in advance.

Note that the other configuration of the terminal device 400 of the distributed antenna system 1 in the present embodiment is basically similar to the configuration of the terminal device 900 of the conventional distributed antenna system 6 illustrated in FIG. 3 described above, and thus the description thereof will be omitted.

Operation of Communication Control Device

Figure 12:
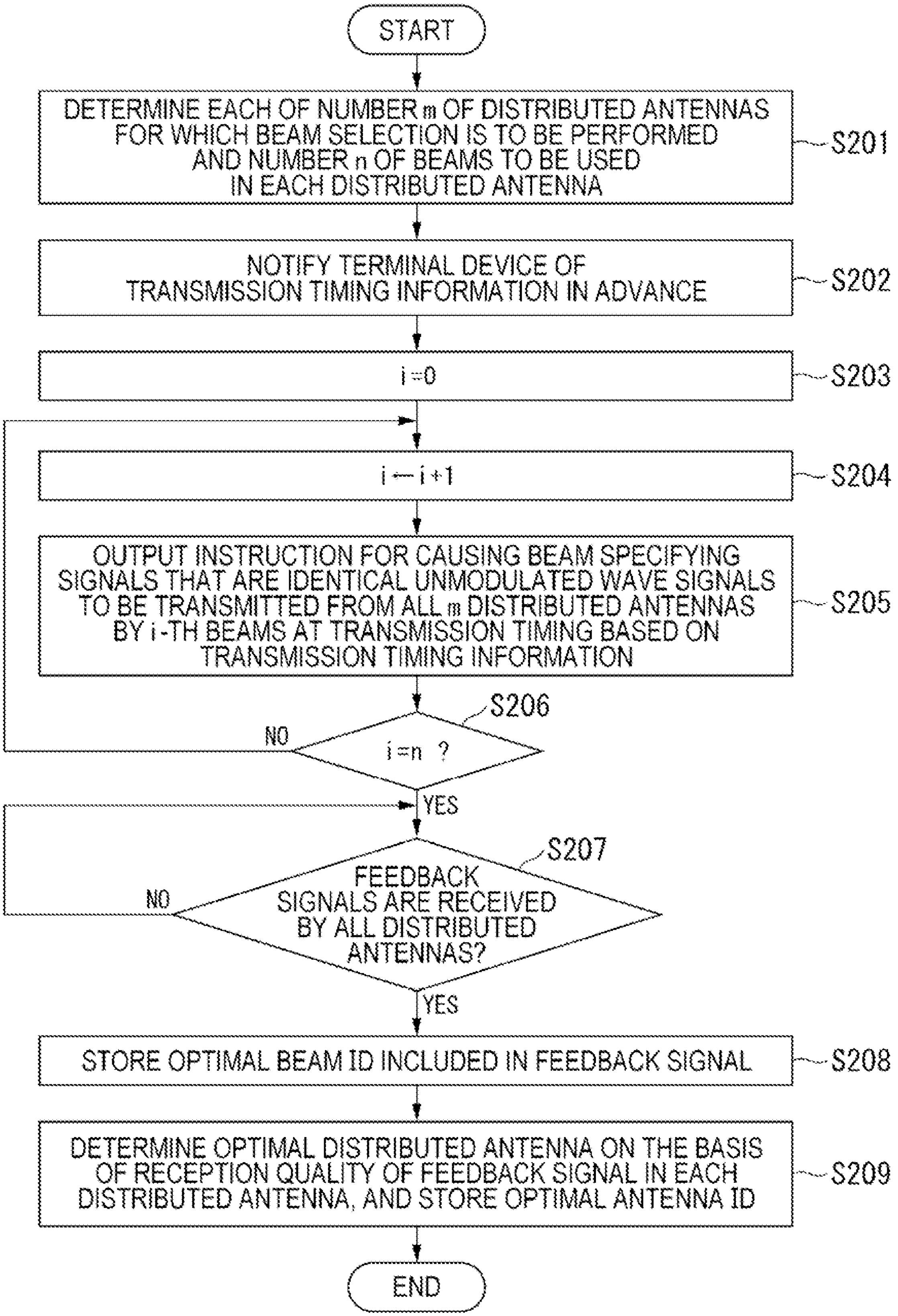
FIG. 12 is a flowchart illustrating operation of the communication control device 100*a* of the distributed antenna system in the second embodiment of the present invention.
Figure 13:
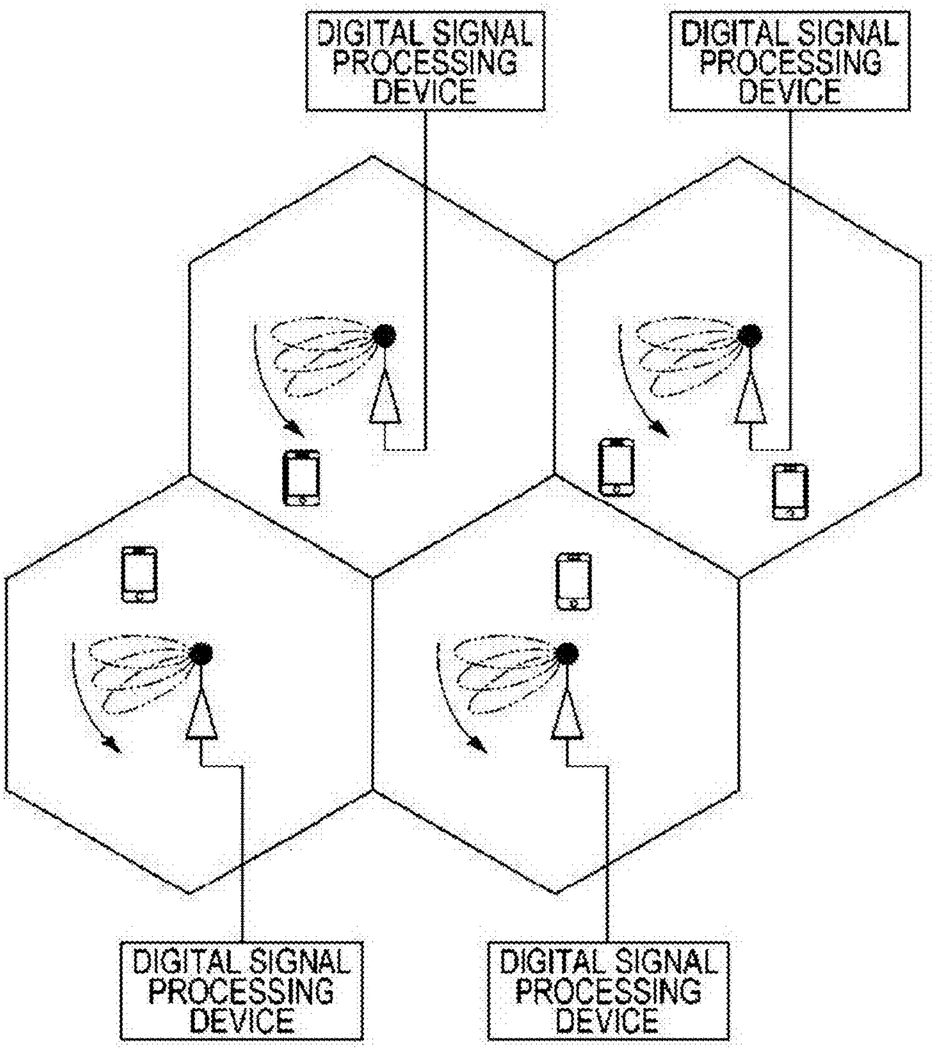
FIG. 13 is a diagram illustrating a general system configuration of a conventional wireless communication system.

Hereinafter, a description will be given of an example of operation of the communication control device 100*a* in antenna and beam selection performed by the distributed antenna system of the second embodiment. FIG. 12 is a flowchart illustrating operation of the communication control device 100*a* of the distributed antenna system in the second embodiment of the present invention.

First, the unmodulated wave signal simultaneous transmission instruction unit 101*a* determines each of a value of the number m of the distributed antennas 300 for which beam selection is to be performed and a value of the number n of beams to be used in each distributed antenna 300 (step S201). At this time, as illustrated in FIG. 9, for each of beams simultaneously used for the transmission of the unmodulated wave signals by the plurality of distributed antennas 300, the unmodulated wave signal simultaneous transmission instruction unit 101*a* respectively allocates beam IDs that can uniquely identify the beams.

Next, the unmodulated wave signal simultaneous transmission instruction unit 101*a* notifies the terminal device 400 of the transmission timing information in advance (step S202). As described above, the transmission timing information is information indicating the transmission timing of the unmodulated wave signals simultaneously transmitted from the m distributed antennas for each beam ID.

Next, the unmodulated wave signal simultaneous transmission instruction unit 101*a* initializes a value of a counter i for counting beams that are caused to transmit the unmodulated wave signals, and sets i=0) (step S203).

Next, to cause the unmodulated wave signal to be transmitted by the next beam (that is, to perform a sweep of the beam), the unmodulated wave signal simultaneous transmission instruction unit 101*a* increments the value of the counter i by 1, and sets i←i+1 (step S204).

Next, the unmodulated wave signal simultaneous transmission instruction unit 101*a* outputs, to the digital signal processing device 200, an unmodulated wave signal simultaneous transmission instruction that is an instruction for causing the unmodulated wave signals to be transmitted from all the m distributed antennas 300 by the i-th beams at the transmission timing of the i-th beams based on the transmission timing information of which the terminal device 400 is notified in advance (step S205).

The unmodulated wave signal simultaneous transmission instruction unit 101*a* repeats output of the identical unmodulated wave signal transmission instruction to the digital signal processing device 200 until the unmodulated wave signals are caused to be transmitted from all the m distributed antennas 800 by the n types of beams (that is, until i=n is satisfied) (steps S204 to S206).

Next, the distributed antenna-specific feedback result reception unit 102 waits for the feedback signal transmitted from the terminal device 400 for the transmitted unmodulated wave signals to be received by all the m distributed antennas 300 (step S207). Here, the feedback signal includes the information indicating the optimal beam ID.

Next, in a case where the feedback signal is received by all the m distributed antennas 300 (step S207: YES), the distributed antenna-specific feedback result reception unit 102 acquires the information indicating the optimal beam ID included in the feedback signal from the digital signal processing device 200. The distributed antenna-specific feedback result reception unit 102 outputs the acquired optimal beam ID to the optimal antenna and beam selection unit 103. The optimal antenna and beam selection unit 103 causes the optimal antenna and beam storage unit 104 to store information indicating a beam associated with the optimal beam ID (step S208).

Next, the distributed antenna-specific feedback result reception unit 102 acquires the information indicating the measurement result of the reception quality of the feedback signal in each distributed antenna 300 from the digital signal processing device 200. On the basis of the acquired measurement result, the distributed antenna-specific feedback result reception unit 102 determines, for example, the distributed antenna 300 having the best reception quality as a distributed antenna optimal for wireless communication with the terminal device 400.

The distributed antenna-specific feedback result reception unit 102 outputs information indicating the distributed antenna 300 determined as the optimal distributed antenna to the optimal antenna and beam selection unit 103. The optimal antenna and beam selection unit 103 causes the optimal antenna and beam storage unit 104 to store the acquired information indicating the distributed antenna 300 (step S209). Thus, the operation of the communication control device 100 illustrated in the flowchart of FIG. 12 ends.

Operation of Terminal Device

Since operation of the terminal device 400 of the distributed antenna system in the present embodiment is basically similar to the operation of the terminal device 900 of the conventional distributed antenna system 6 illustrated in FIG. 3 described above, the description thereof will be omitted.

As described above, in the distributed antenna system 1 in the second embodiment of the present invention, the terminal device 400 is notified of the transmission timing information indicating the transmission timing of the unmodulated wave signal for each beam ID in advance from the distributed antenna 300 side (the accommodated station side) so that the terminal device 400 can specify the beam ID associated with the beam used when the distributed antenna 300 transmits the beam specifying signal that is the unmodulated wave signal. On the distributed antenna 300 side (accommodated station side), all the distributed antennas 300 simultaneously perform sweeps of beams to transmit the unmodulated wave signals to the terminal device 400 at the transmission timing of the unmodulated wave signal for each beam ID based on the transmission timing information of which the terminal device 400 is notified in advance.

The terminal device 400 receives the beam specifying signals at a reception timing synchronized with the transmission timing of the unmodulated wave signal for each beam ID, thereby being able to specify a beam ID of a beam used for transmission of each received unmodulated wave signal. The terminal device 400 specifies the beam ID having the best reception quality on the basis of a measurement result of the reception qualities of the unmodulated wave signals for the respective beam IDs. The terminal device 400 embeds the specified beam ID in the feedback signal as the optimal beam ID. The terminal device 400 transmits the feedback signal including the optimal beam ID to the distributed antenna 300 side (accommodated station side).

The distributed antenna 300 side (accommodated station side) receives the feedback signal transmitted from the terminal device 400, and reads the optimal beam ID included in the received feedback signal. The distributed antenna 300 side (accommodated station side) performs setting to use the beam associated with the read optimal beam ID in wireless communication with the terminal device 400. In addition, the distributed antenna 300 side (the accommodated station side) receives the feedback signal transmitted from the terminal device 400 by all the distributed antennas 300, The distributed antenna 300 side (the accommodated station side) specifies the distributed antenna 300 that has received the feedback signal having the best reception quality (for example, reception power) among the feedback signals received by the respective distributed antennas 300. The distributed antenna 300 side (accommodated station side) performs setting to use the specified distributed antenna 300 in wireless communication with the terminal device 400.

The distributed antenna system 1 in the second embodiment of the present invention has the configuration as described above, thereby simultaneously transmitting the beam specifying signals that are unmodulated wave signals from the plurality of distributed antennas 300 to the terminal device 400, so that the transmission of the unmodulated wave signals from the plurality of distributed antennas 300 can be completed only in the time required for the transmission of the beam search signals by one distributed antenna 300. As a result, in the distributed antenna system 1 in the present embodiment, even in a case where the number of distributed antennas 300 increases, the time required for beam selection does not increase, and thus, the overhead does not increase and the data transmission efficiency does not decrease. In addition, in the distributed antenna system 1 in the present embodiment, even in a case where the number of distributed antennas 300 increases, the time required for beam selection does not increase, and thus, it is not difficult to cause the directivity of the distributed antenna 300 to follow movement of the terminal device 400, and it is possible to prevent the wireless communication itself between the distributed antenna side (accommodated station side) and the terminal device from becoming difficult.

As described above, in the distributed antenna system 1 in the second embodiment, it is not necessary to include the information indicating the beam ID in the beam specifying signal, whereby the unmodulated wave (CW) signal can be used. The beam selection is performed by using the unmodulated wave signal, whereby it is possible to perform, for example, evaluation of the reception quality of the feedback signal more evenly and with higher accuracy. As a result, according to the distributed antenna system 1 in the present embodiment, it is possible to perform selection of the optimal distributed antenna 300 in wireless communication with the terminal device 400 with higher accuracy.

Note that there is only a condition that it is not necessary to include the information indicating the beam ID in the beam specifying signal, and a radio wave used in the beam selection by the distributed antenna system 1 in the second embodiment is not limited to the unmodulated wave (CW). For example, a sounding reference signal (SRS) may be used in the beam selection by the distributed antenna system in the present embodiment.

Note that, in the distributed antenna system 1 in the present embodiment, the numbers of beams used by the plurality of distributed antennas 300 are the same, but different numbers of beams may be used for the respective distributed antennas 300. In this case, there may be an unmodulated wave signal transmitted only by the distributed antenna 300 having a larger number of beams to be used than the other distributed antennas 300.

Note that, in the distributed antenna system 1 in the present embodiment, the unmodulated wave signals are simultaneously transmitted from all the distributed antennas 300, but the unmodulated wave signals may be simultaneously transmitted from only some of the distributed antennas 300.

Note that, in the distributed antenna system 1 in the present embodiment, a case where beam selection is not performed on the terminal device 400 side has been described as an example, but the present invention is not limited thereto. For example, the terminal device 400 may be configured to perform adaptive beamforming using a plurality of beams similarly to the distributed antenna 300. In this case, for example, the terminal device 400 only needs to transmit a feedback signal including a beam ID to the distributed antenna 300 for each beam ID by a beam associated with the beam ID. Then, on the distributed antenna 300 side (the accommodated station side), the reception quality of the feedback signal is measured for each beam ID on the terminal device 400 side, and a beam ID included in a feedback signal having the best reception quality is used as an optimal beam ID (on the terminal device 400 side) to perform feedback to the terminal device 400. In addition, when receiving the unmodulated wave signal from the distributed antenna 300, the terminal device 400 may specify a beam to be used by switching reception beams and measuring the reception quality (for example, reception power) of each beam.

Note that the distributed antenna system 1 in each of the above-described embodiments performs wireless communication using adaptive beamforming. The distributed antenna system 1 in each embodiment selects an optimal beam from a plurality of beams. As described above, the optimal beam mentioned here is a beam having the best reception quality such that the value of the reception power is maximized, for example. In each of the above-described embodiments, it is assumed that each distributed antenna 300 includes a plurality of antenna elements, and a plurality of types of beams can be formed for each distributed antenna 300.

According to the above-described embodiments, the communication control device includes a transmission and reception unit (transceiver) and a selection unit (selector). For example, the communication control device is the communication control device 100 in the first embodiment, the transmission and reception unit (transceiver) is the identical beam search signal simultaneous transmission instruction unit 101 and the distributed antenna-specific feedback result reception unit 102 in the first embodiment, and the selection unit (selector) is the optimal antenna and beam selection unit 103 in the first embodiment.

The transmission and reception unit (transceiver) simultaneously transmits beam specifying signals including identical beam identifiers by transmission beams associated with the beam identifiers from a plurality of antennas to the wireless station for each beam identifier. For example, the beam identifier is the beam ID in the first embodiment, the beam specifying signal is the beam search signal in the embodiments, the antenna is the distributed antenna 300 in the first embodiment, and the wireless station is the terminal device 400 in the first embodiment.

In addition, the transmission and reception unit (transceiver) receives, by each of the plurality of antennas, a report signal including a selected beam identifier indicating a beam identifier selected on the basis of reception qualities of the beam specifying signals for the respective beam identifiers in the wireless station. For example, the report signal is the feedback signal in the first embodiment, and the selected beam identifier is the optimal beam ID in the first embodiment.

The selection unit selects an antenna to be used for communication with the wireless station on the basis of the reception qualities of the report signal respectively received by the plurality of antennas, and selects a transmission beam associated with the selected beam identifier as a transmission beam to be used for communication with the wireless station.

In addition, according to the above-described embodiments, the communication control device includes the transmission and reception unit (transceiver) and the selection unit (selector). For example, the communication control device is the communication control device 100*a* in the second embodiment, the transmission and reception unit (transceiver) is the unmodulated wave signal simultaneous transmission instruction unit 101*a* and the distributed antenna-specific feedback result reception unit 102 in the second embodiment, and the selection unit (selector) is the optimal antenna and beam selection unit 103 in the second embodiment.

The transmission and reception unit (transceiver) transmits the beam specifying signals from a plurality of antennas to the wireless station at a predetermined transmission timing for each of a plurality of transmission beams by sequentially using the plurality of transmission beams. For example, the beam specifying signal is the unmodulated wave signal in the second embodiment, the antenna is the distributed antenna 300 in the second embodiment, and the wireless station is the terminal device 400 in the second embodiment.

In addition, the transmission and reception unit (transceiver) receives, by each of the plurality of antenna, a report signal including information based on a beam specifying signal selected on the basis of reception timings and reception qualities of the beam specifying signals for the respective transmission beams in the wireless stations. For example, the report signal is the feedback signal in the second embodiment.

The selection unit (selector) selects an antenna to be used for communication with the wireless station on the basis of the reception qualities of the report signal respectively received by the plurality of antennas, and selects a transmission beam to be used for communication with the wireless station on the basis of the information included in the report signal.

Note that, in the communication control device, the information included in the report signal may be information indicating the order in which the selected beam specifying signal is received.

Note that, in the communication control device, the beam specifying signals may be transmitted from the plurality of antennas by using unmodulated waves.

Note that, in the communication control device, the beam specifying signals may be sounding reference signals.

A part or all of each device of the communication control device, the digital signal processing device, and the terminal device in each of the above-described embodiments may be implemented by a computer. In that case, a program for implementing this function may be recorded in a computer-readable recording medium, and the program recorded in the recording medium may be read and executed by a computer system to implement the function. Note that the "computer system" mentioned herein includes an OS and hardware such as peripheral devices. In addition, the "computer-readable recording medium" refers to a portable medium such as a flexible disk, a magneto-optical disc, a ROM, or a CD-ROM, or a storage device such as a hard disk included in the computer system. Further, the "computer-readable recording medium" may include a medium that dynamically stores the program for a short time, such as a communication line in a case where the program is transmitted via a network such as the Internet or a communication line such as a telephone line, and a medium that stores the program for a certain period of time, such as a volatile memory inside the computer system serving as a server or a client in that case. Also, the program may be for implementing a part of the function described above, may be implemented in a combination of the function described above and a program already recorded in the computer system, or may be implemented with a programmable logic device such as a field programmable gate array (FPGA).

Although the embodiments of the present invention have been described in detail with reference to the drawings, specific configurations are not limited to the embodiments, and include design and the like within the scope of the present invention without departing from the gist of the present invention.

REFERENCE SIGNS LIST

1, 6 Distributed antenna system
100, 100*a* Communication control device (apparatus)
101 Identical beam search signal simultaneous transmission instruction unit
101*a* Unmodulated wave signal simultaneous transmission instruction unit
102 Distributed antenna-specific feedback result reception unit
103 Optimal antenna and beam selection unit
104 Optimal antenna and beam storage unit
200 Digital signal processing device
300 Distributed antenna
400 Terminal device
600 Communication control device
601 Beam specifying signal transmission instruction unit
602 Feedback result reception unit
603 Optimal antenna and beam selection unit
604 Optimal antenna and beam storage unit
700 Digital signal processing device
800 Distributed antenna
900 Terminal device
901 Antenna unit
902 Digital signal processing unit
903 Optimal beam ID selection unit
904 Feedback signal transmission instruction unit

The invention claimed is:

1. A communication control method comprising:

simultaneously transmitting identical beam specifying signals respectively including an identical beam identifier from a plurality of antennas to a wireless station by transmission beams associated with the identical beam identifier;

receiving, by at least one of the plurality of antennas, a report signal indicating a selected beam including the identical beam identifier, the selected beam being selected on a basis of reception qualities of the identical beam specifying signals in the wireless station; and selecting a transmission beam associated with the identical beam identifier as a transmission beam to be used for communication with the wireless station.

2. The communication control method according to claim 1, wherein the identical beam specifying signals are transmitted from the plurality of antennas by using unmodulated waves.

3. The communication control method according to claim 1, wherein the identical beam specifying signals are sounding reference signals.

4. The communication control method according to claim 1, wherein, in the reception of the report signal, the report signal is received by the plurality of antennas.

5. A communication control method for a wireless communication system including a first wireless station and a second wireless station, the communication control method comprising:

simultaneously transmitting, by the first wireless station, identical beam specifying signals respectively including an identical beam identifier from a plurality of antennas to the second wireless station by transmission beams associated with the identical beam identifier;

receiving, by the second wireless station, the identical beam specifying signals transmitted from the first wireless station;

selecting, by the second wireless station, a selected beam including the identical beam identifier, the selected beam being selected on a basis of reception qualities of the identical beam specifying signals;

transmitting, by the second wireless station, a report signal indicating the selected beam to the first wireless station;

receiving, by the first wireless station, the report signal by at least one of the plurality of antennas; and selecting, by the first wireless station, a transmission beam associated with the identical beam identifier as a transmission beam to be used for communication with the second wireless station.

6. A communication control device comprising:

a transceiver that simultaneously transmits identical beam specifying signals respectively including an identical beam identifier from a plurality of antennas to a wireless station by transmission beams associated with the identical beam identifier;

a receiver that receives, by each at least one of the plurality of antennas, a report signal indicating a selected beam including the identical beam identifier, the selected beam being selected on a basis of reception qualities of the identical beam specifying signals in the wireless station; and a selector that selects a transmission beam associated with the identical beam identifier as a transmission beam to be used for communication with the wireless station.

* * * * *